N. W. HARTMAN.
GLASSWORKING MECHANISM.
APPLICATION FILED JAN. 27, 1913.
1,408,000.
Patented Feb. 28, 1922.
10 SHEETS—SHEET 3.
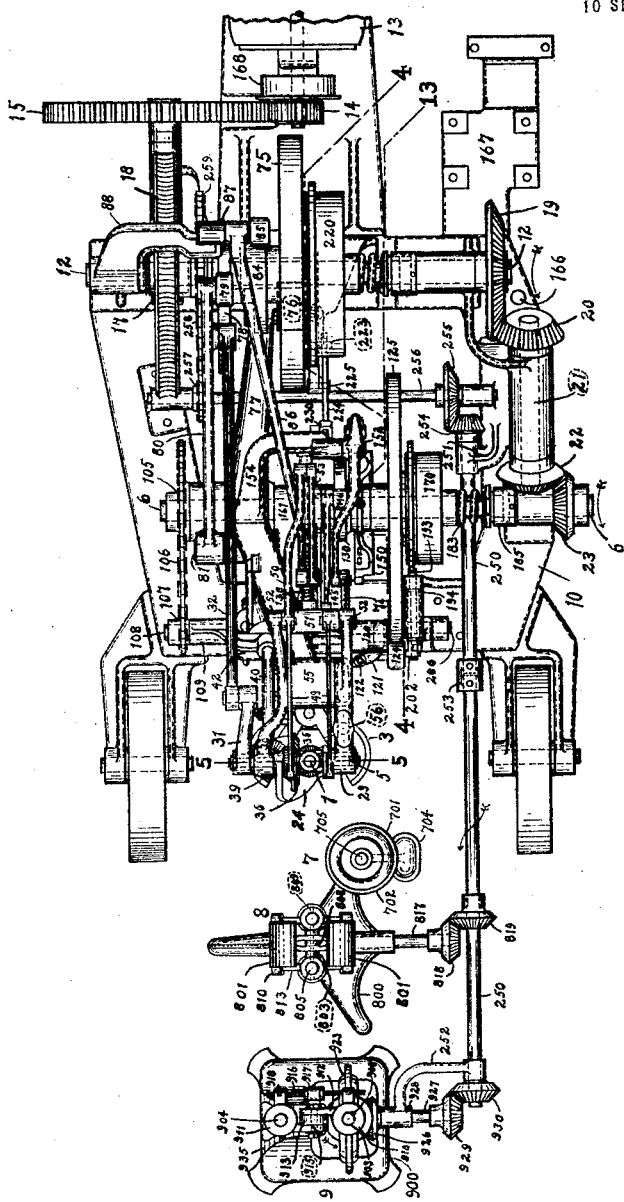
Fig. 3.
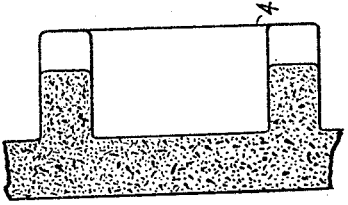
WITNESSES
Frederick E. Leonard
Richard J. Tighe
INVENTOR
Noble W. Hartman

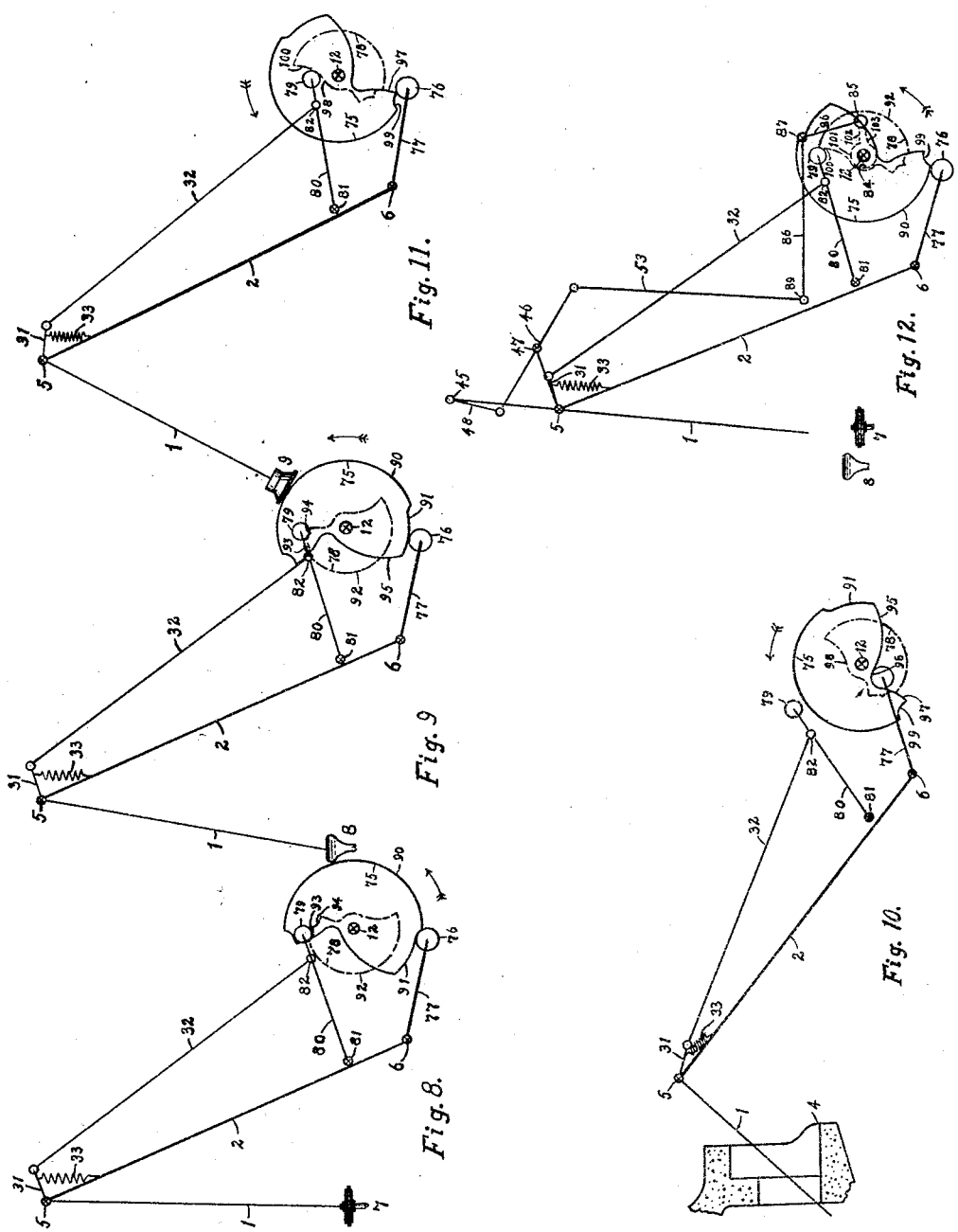

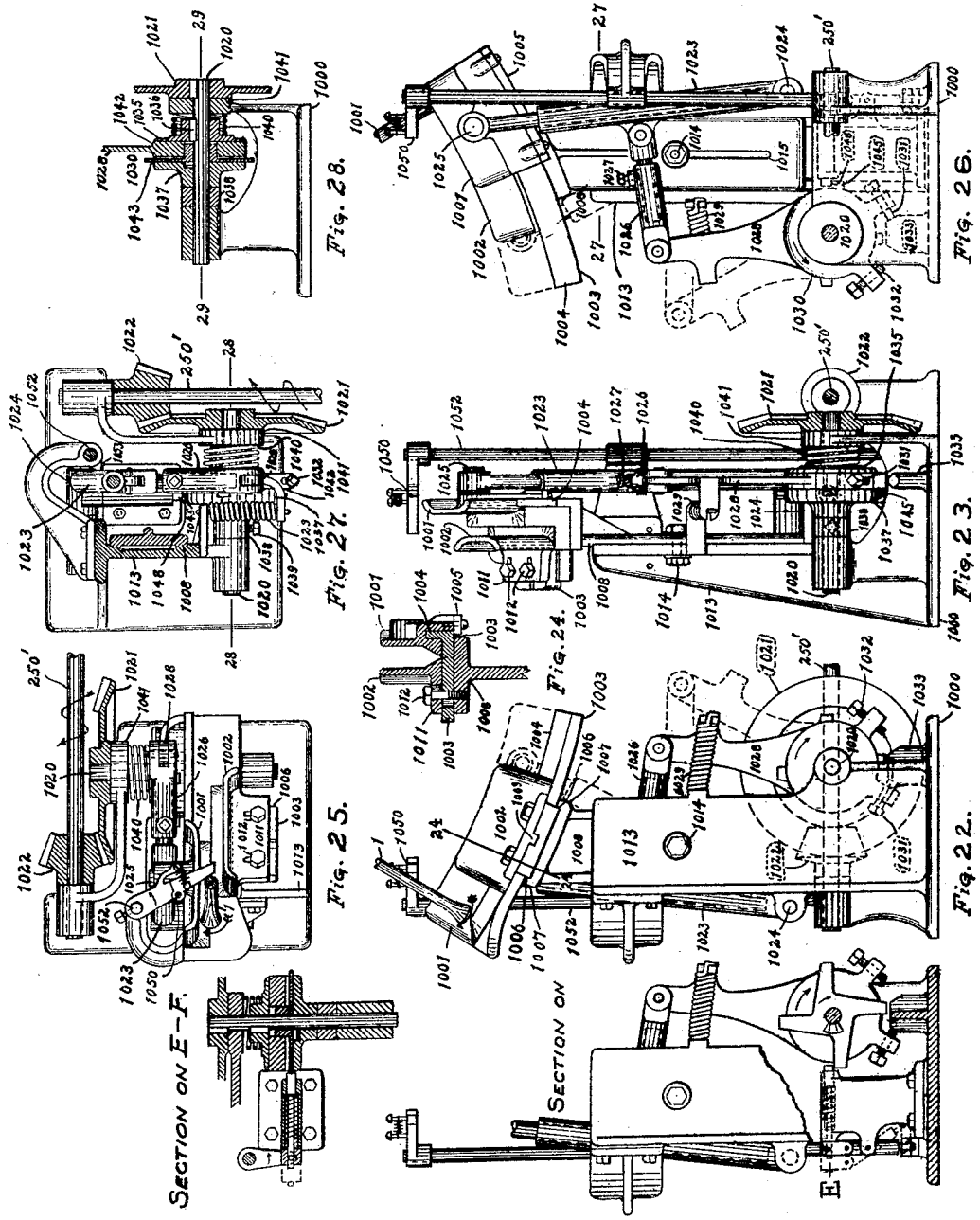

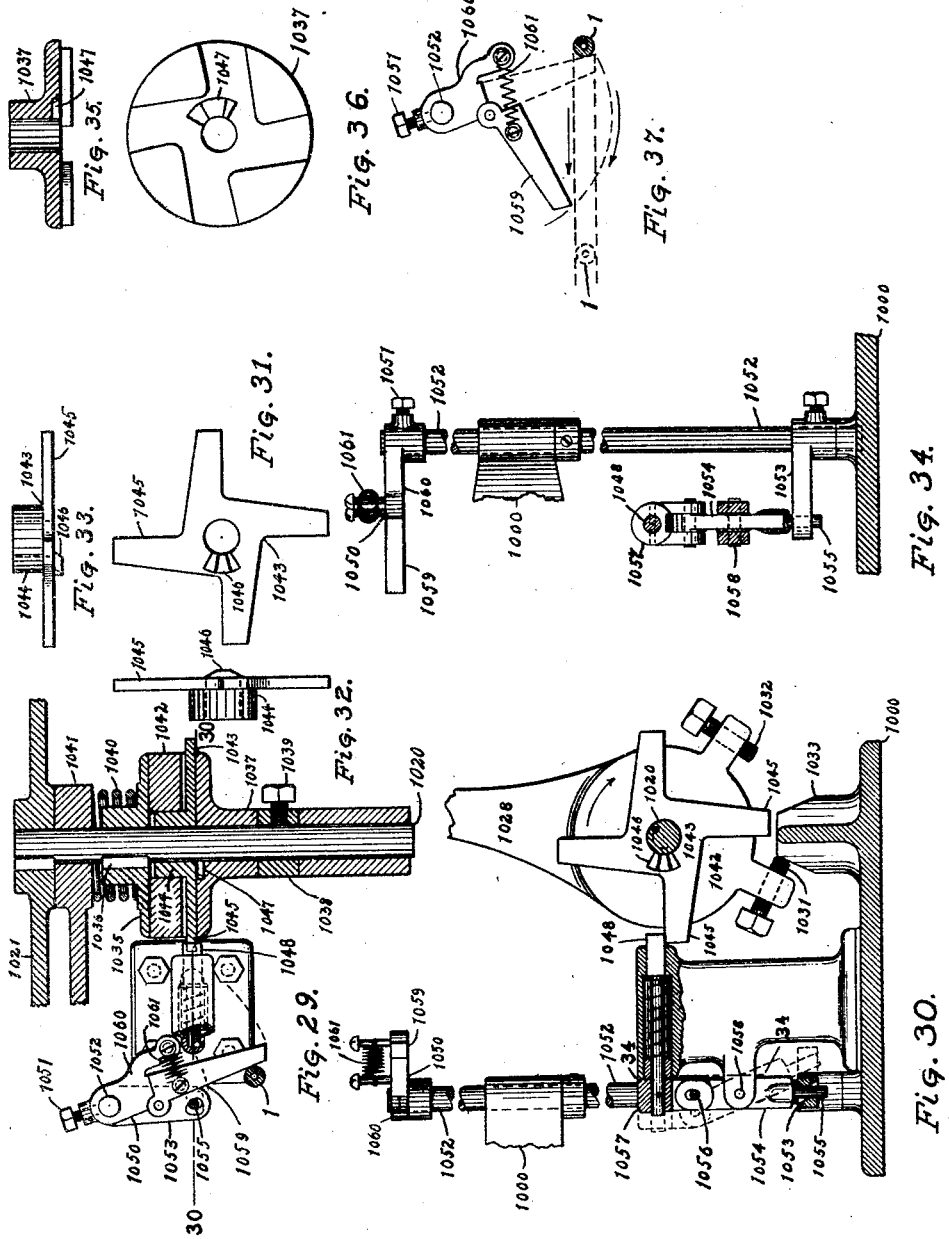

UNITED STATES PATENT OFFICE.

NOBLE W. HARTMAN, OF TOLEDO, OHIO, ASSIGNOR TO GENERAL ELECTRIC COMPANY, A CORPORATION OF NEW YORK.

GLASSWORKING MECHANISM.

1,408,000. Specification of Letters Patent. Patented Feb. 28, 1922.

Application filed January 27, 1913. Serial No. 744,549.

*To all whom it may concern:*

Be it known that I, NOBLE W. HARTMAN, a citizen of the United States, residing at Toledo, Ohio, have invented certain new and useful Improvements in Glassworking Mechanism, of which the following is a specification.

My invention relates to the working of glass, including the manufacture of articles of glass by blowing methods, and it comprises both certain novel methods of glass working and also novel mechanism and apparatus for this purpose. I have hereinafter described a glass working machine which is adapted for automatic operation efficiently and economically with particular reference to its employment in the production of incandescent lamp bulbs; but while the invention extends to the particular mechanism described and its specific features and details, which are of importance because of their specific advantages, yet the invention is not confined to this machine and its details, but can be otherwise carried out and applied, and can be employed, also, in the production of articles other than bulbs for incandescent lamps. Amongst various practical advantages obtainable in connection with my invention which will hereinafter become apparent are uniformity of product and rapidity and cheapness of production,—besides other well-known advantages of manufacture by entirely automatic machinery over manufacture involving the employment of skilled labor and the idiosyncrasies of the individual workman.

As to certain features of the machine described, this application is a continuation of my prior application Serial No. 507,056 filed July 12, 1909 under the title "Glass blowing machine." The machine described also embodies certain features of that disclosed in Patent No. 813,289 granted to me February 20, 1906 under the same title.

The machine herein shown and described is adapted to take or receive molten glass and to produce complete lamp bulbs therefrom. In this machine, the actual formation of a bulb is effected by blowing in a mold, and the machine comprises a so-called "blow-iron" on which a charge of glass may be carried and manipulated and which is adapted to co-operate with the mold and also with various other agencies and mechanisms, provision being made for relative movement of the blow-iron and these various agencies to bring them into co-operative relation in the most advantageous manner. After the blow-iron has received the charge of glass,—to outline briefly the general action of the machine,—the charge may when necessary be prepared and brought to such shape that the glass will be properly distributed in the blown article by inertia force due to suitable movement of the blow-iron or by the direct action of suitable shaping means upon the glass in a manner corresponding to the operation of hand blowing known as "marvering," or both. The glass on the blow-iron having been brought into the mold and the latter closed, the blowing occurs, air under pressure passing through the blow-iron and expanding the glass against the walls of the mold. The blowing having been concluded and the mold opened, the blown bulb is withdrawn and is detached by a detaching device, which may preferably act after the withdrawal of the bulb from the mold. Removal of any glass adhering to the blow-iron having been effected by a cleaning device, the blow-iron is ready for another charge of glass and the machine as a whole for another cycle of operations. The blow-iron is preferably rotated during the blowing, in order that the surface of the blown article may be perfectly smooth; and as such rotation does not necessarily interfere with the other operations, but may even be made to facilitate some or all of them, it need not be interrupted.

In the drawings, Figure 1 is a side elevation of a glass blowing machine constructed in accordance with my invention, certain minor parts being broken away or altogether removed, and the intermediate portions of other parts being broken away or removed in order that the uppermost parts of the machine may be brought within the limits of the drawing.

Figure 3 is a plan view of the machine as a whole, certain parts being broken away or omitted.

Figures 8, 9, 10, 11, and 12 are diagrams illustrating the operation of the machine.

Figure 13:
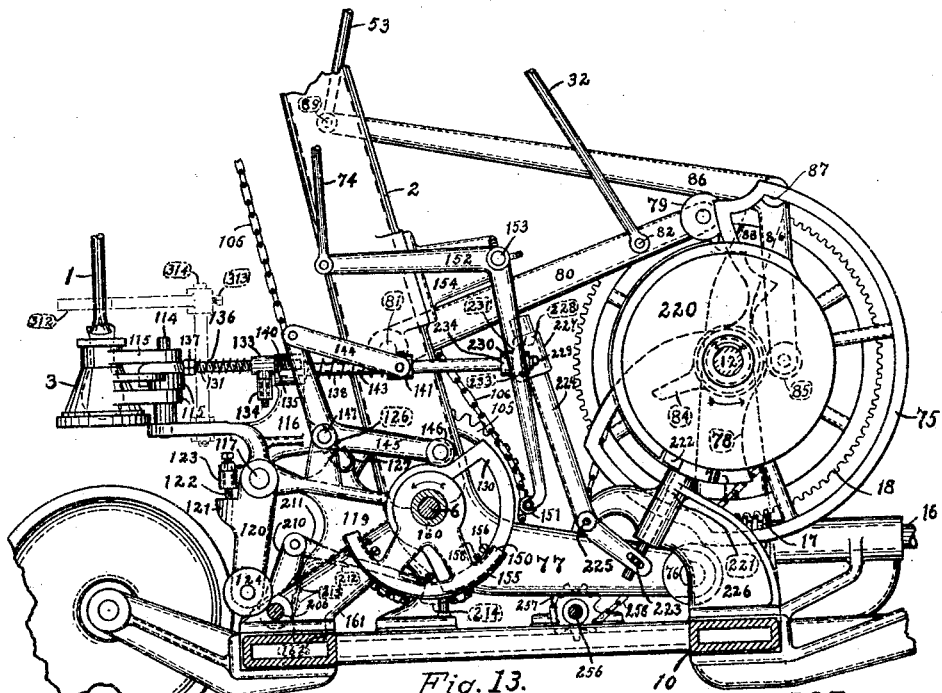

Figure 13 is a side elevation of the parts comprised in the lower portion of the machine which lie behind the vertical surface corresponding substantially to the line 13—13 in Figure 3, certain parts being shown as in section at said surface.

Figure 1:
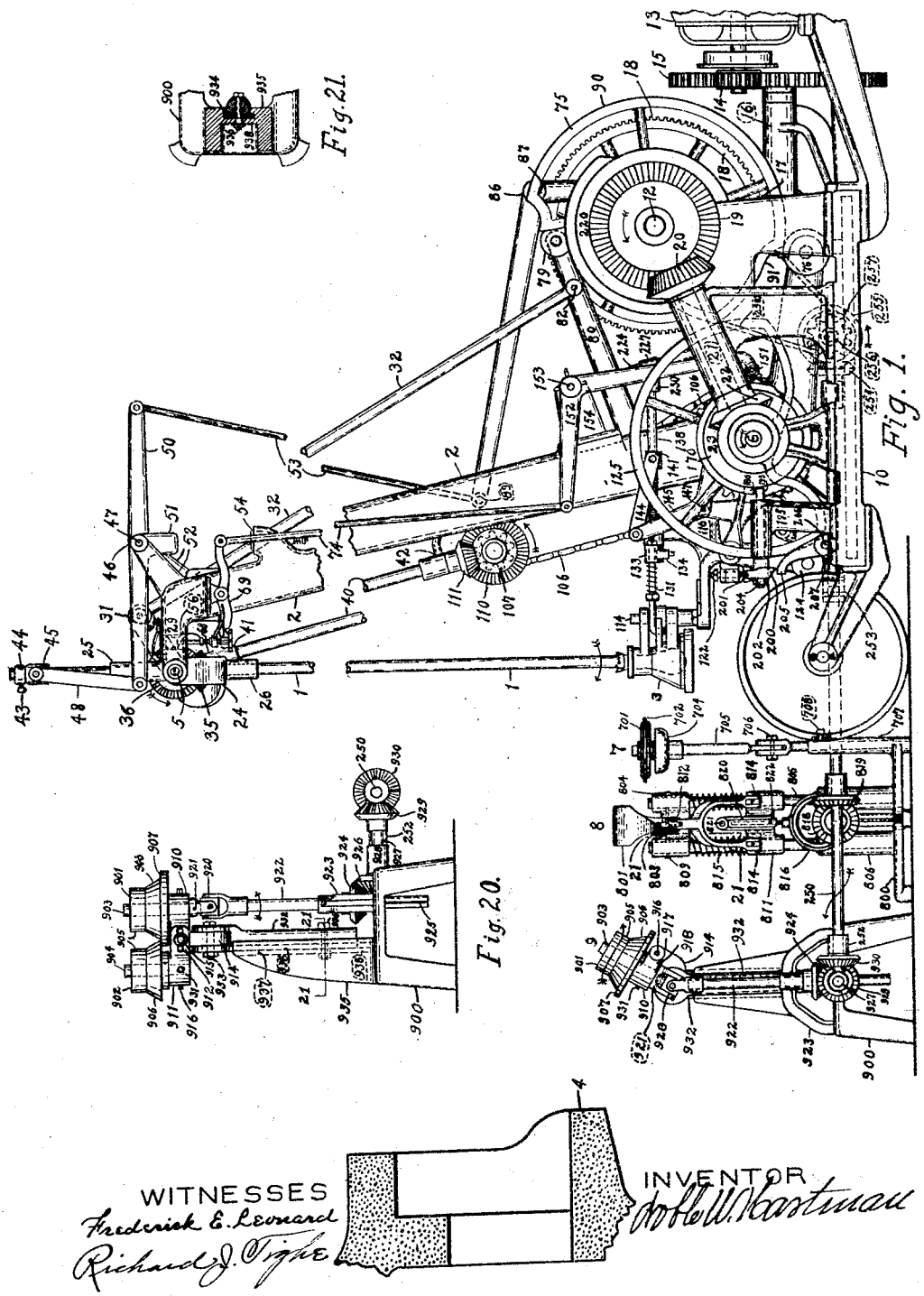

Figure 14 is a plan view of the mold and various parts associated with it or specially concerned in the blowing of the bulb, certain parts being in section at a horizontal surface corresponding to the line 14—14 in Figure 1.

Figure 15:
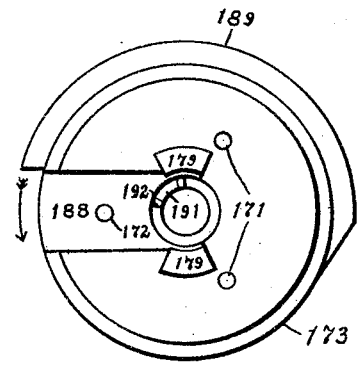
Figure 16:
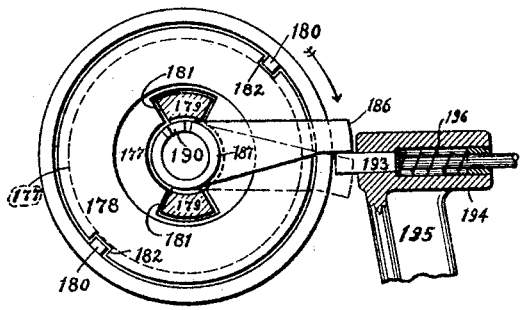

Figure 15 is a side elevation of a part of the machine which as a whole lies behind (to the left of) the line 15—16 in Figure 14; and Figure 16 is a similar view of parts which as a whole lie in front (to the right of) said line, portions of the first mentioned part being in section at a vertical surface corresponding to said line.

Fig. 17 is a front elevation (at right angles to the view afforded by Fig. 1) of a mechanism of my machine which is intended to clean off any glass adhering to the blow-iron after the detachment of the blown bulb, certain parts being broken away or in section as indicated by the line 17—17 in Fig. 1 and the mechanism for detaching the bulb also appearing with certain parts in section or broken away.

Fig. 18 is a plan view of a bulb detaching mechanism which embodies certain features additional to those of that shown in Figs. 1, 3, and 17, a portion of the cleaning off mechanism being diagrammatically indicated; and Fig. 19 is a side elevation of the parts shown in Fig. 18 from the right of that figure.

Fig. 20 is a front elevation (from the left of Fig. 1) of a mechanism of my machine which may be employed for shaping the glass preparatory to the blowing operation; and Fig. 21 is a view looking downward upon the parts of this mechanism which lie beneath the plane of section indicated by the line 21—21 in Fig. 20.

Fig. 22 is a side elevation of a device for preparatory shaping of the glass different from that shown in Figs. 1, 3, 20, etc., the figure giving the same view of the device as Fig. 1 gives of that therein shown; and Fig. 23 is a front elevation of the device (from the right of Fig. 22).

Fig. 24 is a detail view showing certain parts in section at an inclined surface corresponding to the line 24—24 in Fig. 22.

Fig. 25 is a plan view showing the device in the same position as Fig. 22, two gears comprised in it being in mid-section.

Fig. 26 is a view similar to Fig. 22, but from the opposite side of the device.

Fig. 27 is a plan view showing the device in the same position as Fig. 26 of the machine, certain parts above a horizontal plane of section corresponding to the line 27—27 in Fig. 26 being omitted, and two gears being shown in mid-section.

Fig. 28 is an elevational detail view illustrating the construction of a clutch mechanism forming part of the device, certain parts being shown in section at a vertical surface corresponding to the line 28—28 in Fig. 27.

Fig. 29 is a plan view on an enlarged scale also illustrating the construction and actuation of the clutch mechanism aforesaid, certain parts being shown in section at a horizontal surface corresponding to the line 29—29 in Fig. 28, various other parts being broken away.

Fig. 30 is an elevation showing the parts which appear in Fig. 29 and several others from the front of Fig. 22, various parts being broken away and removed and others being in section at a vertical surface corresponding to the line 30—30 in Fig. 29.

Figs. 31, 32, and 33 are views of one of the parts of the clutch mechanism aforesaid.

Fig. 34 is a view from the left of Fig. 30 showing various parts as in section at a vertical surface corresponding to the line 34—34 in Fig. 30.

Figs. 35 and 36 are views of a part of the clutch mechanism mentioned above which is intimately associated with the part illustrated in Figs. 31, 32, and 33, Fig. 35 being a mid-section view.

Fig. 37 is a somewhat diagrammatic plan view illustrating the behavior of certain parts shown in Fig. 29 with reference to the blow-iron.

Referring first to Fig. 1, it will be seen that the blow-iron 1 is supported from a column-like part or structure 2, that the blow-iron is in operative position with respect to the mold 3 for the blowing of a bulb, and that both it and the structure 2 are in a more or less nearly vertically upright position. Provision for "gathering" a charge or batch of molten glass from a suitable source of supply, such as an ordinary glass furnace 4 in front of the machine, for manipulating this charge, and for bringing about the operation of the various mechanisms and agencies of the machine upon the charge is in part made by mounting the blow-iron 1 so as to be capable of swinging with reference to the structure 2 in a more or less nearly vertical plane about a transverse axis 5 perpendicular to the plane of the paper and of movement in its own longitudinal direction with reference to the axis 5 about which it thus swings, and also by making the structure 2 itself capable of swinging about an axis perpendicular to the plane of the paper which may for the present be conveniently referred to as coincident with a shaft 6,—all these movements taking place without interference with one another or with the rotation of the blow-iron about its own longitudinal axis. From Figs. 4 and 10 it will be seen that the gathering of a charge of glass occurs when the column 2 and the blow-iron 1 are swung forward so that the lower end of the blow-iron is projected into the molten glass in the furnace 4. The removal of the blown bulb out of the mold 3 the detachment of the same from the blow-iron, and the cleaning off of any glass left adhering to the blow-iron take place during this forward movement of the latter from the position shown in Fig. 1 to that shown in Figs. 4 and 10, the last two operations being effected by devices or mechanisms 7 and 8 arranged in its path, (see Figs. 8 and 9), and the blow-iron 1 soon after passing idly through the marvering device 9 with which the machine may, as shown, be provided. Any necessary preparatory shaping of the charge of glass—comprising, if desired, marvering by the device 9 (see Fig. 11)—takes place on the return movement of the blow-iron from the furnace 4 to the mold 3.

Referring, now, to Figs. 1, 2, 3, and 4, it will be seen that the main portion of the machine is mounted on a frame structure 10 which comprises various brackets or standards for supporting the parts of the machine or affording them bearing and is itself supported on wheels so as to be easily moved about (only the forward pair of these wheels appearing). Near the rear of the frame 10 is mounted a transverse shaft 12 from which some of the moving parts are more or less directly actuated and from which power is also transmitted or distributed to other parts of the machine,—this shaft being driven from any suitable source of power such as a motor 13 mounted at the rear of the frame and acting through a train of reduction gearing comprising a pinion 14, a large gear 15 on the rear end of a short shaft 16 and a worm 17 on its forward end, and a worm-wheel 18 on the transverse shaft 12. As shown, the transverse shaft 6 in front of the transverse shaft 12 just mentioned (this shaft 6 having already been referred to in locating the axis for the swinging of the movable column structure 2 which carries the axis 5 about which the blow-iron 1 directly swings) receives motion through a train of gearing comprising a bevelled gear 19 on the rear shaft 12 meshing with a bevelled gear 20 on the rear end of an inclined shaft 21 which has on its forward end a bevelled gear 22 meshing with a bevelled gear 23 on shaft 6, and from this shaft 6 various parts are actuated or receive power.

The mounting of the blow-iron 1 and the construction and arrangement of the parts associated with it is shown in Figs. 1, 2, 3, 5, 6, and 7. As will be seen from these figures, and particularly from Figs. 2, 5, and 6, there is at the upper end of the structure 2 a part or structure 24 comprising two vertically bored portions or sleeves 25 and 26 through which the blow-iron 1 slides and in which it rotates, and also comprising more or less nearly horizontal hollow shaft portions or trunnions 27 and 28 which have bearings in brackets 29 and 30 on the structure 2. The portions 25 and 27, 26, and 28 are, it will be seen, connected together by an irregular U shaped web. On the outer end of the trunnion portion 28 is secured a crank or arm 31. The arm 31 is rocked to swing the parts 24 and the blow-iron 1 about the axis or fulcrum 5 formed by the trunnions 27 and 28 through a link or rod 32 which is actuated as hereinafter described. A spring 33 may, as shown (Figs. 2, 4, 6, and 7), be connected from a stud 34 on the arm 31 to an eyelet near the upper end of the column 2 in order to supplement the weight of the rod 32 and the parts (hereinafter described) connected to its lower end in swinging the blow-iron 1 forward with reference to the column 2 whenever the rod 32 is not positively held stationary to prevent it or actuated to produce a contrary movement. (In order that the showing of other parts may be clearer, this spring 33 is omitted from Fig. 5).

On the blow-iron 1 between the upper and lower sleeves 25 and 26 in which it revolves is a bevelled gear 35 operatively connected with the blow-iron 1 in any suitable manner so that the blow-iron may slide freely lengthwise through the gear but is compelled to rotate with it. This gear 35 meshes with a bevelled gear 36 which is practically one part with another bevelled gear 37 mounted with it between the upper bearing sleeve 25 and the trunnion 28, these gears 36 and 37 revolving freely on or with a short shaft 38 (see Fig. 5) part of which is in the hollow shaft 28 and the inner end of which extends into a short bore or circular depression in the side of the part 25. The gear 37 meshes with still another bevelled gear 39 mounted on the upper end of a more or less nearly upright shaft 40 having its bearings in brackets 41 and 42 secured at one side of the structure 2. This shaft 40 is driven in a manner hereinafter described, and from it the blow-iron 1 is rotated through the train of gearing just described while at the same time its vertical movement is not interfered with.

Figure 4:
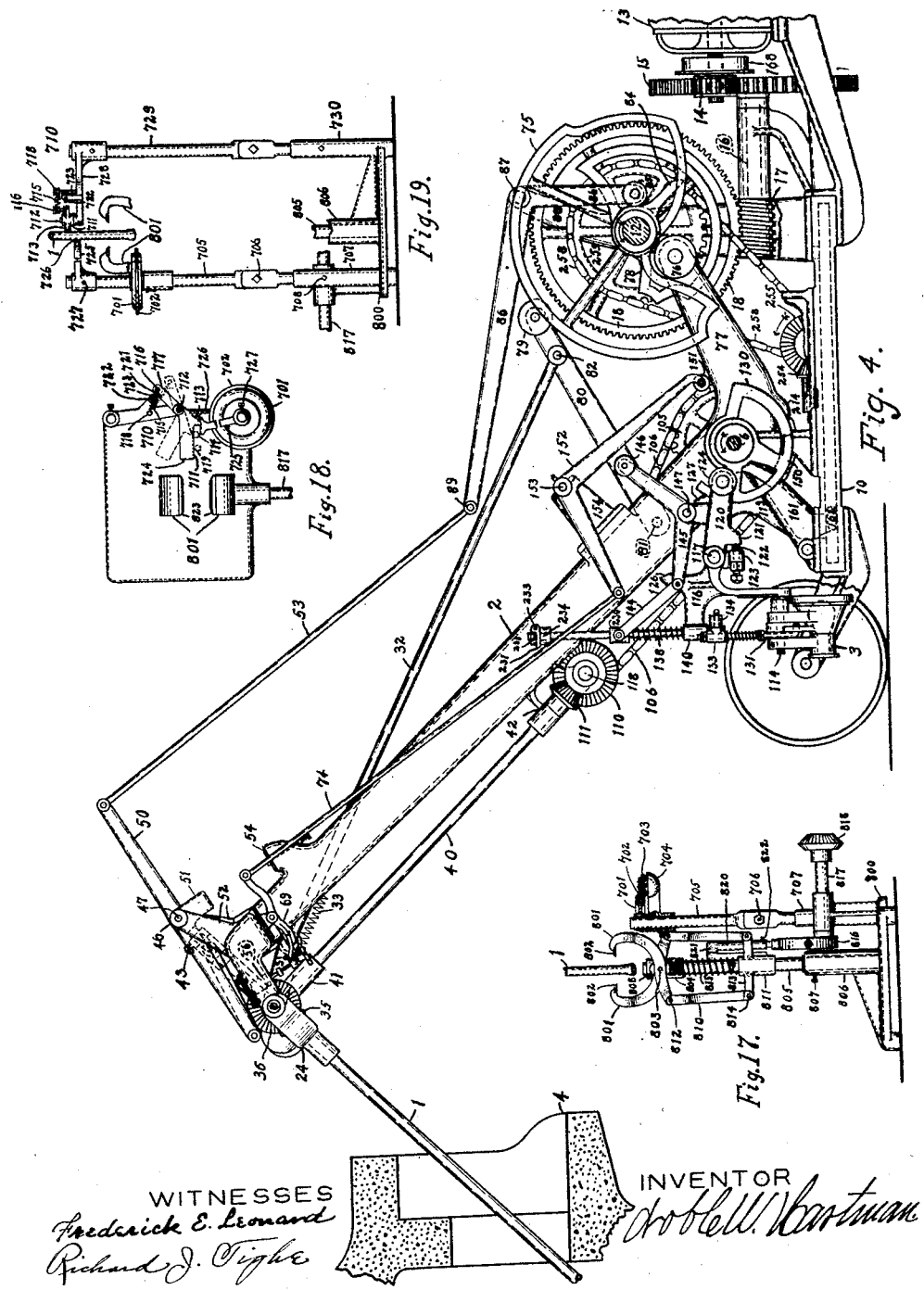
Figure 4 is a side elevation showing substantially the portion of the machine which lies behind the line 4—4 in Figure 3 with the moving parts in positions different from those which they occupy in Figures 1 and 3, certain parts being in section at a vertical surface corresponding to this line, and certain parts being shown in positions which do not correspond to those of the rest.
Figure 5:
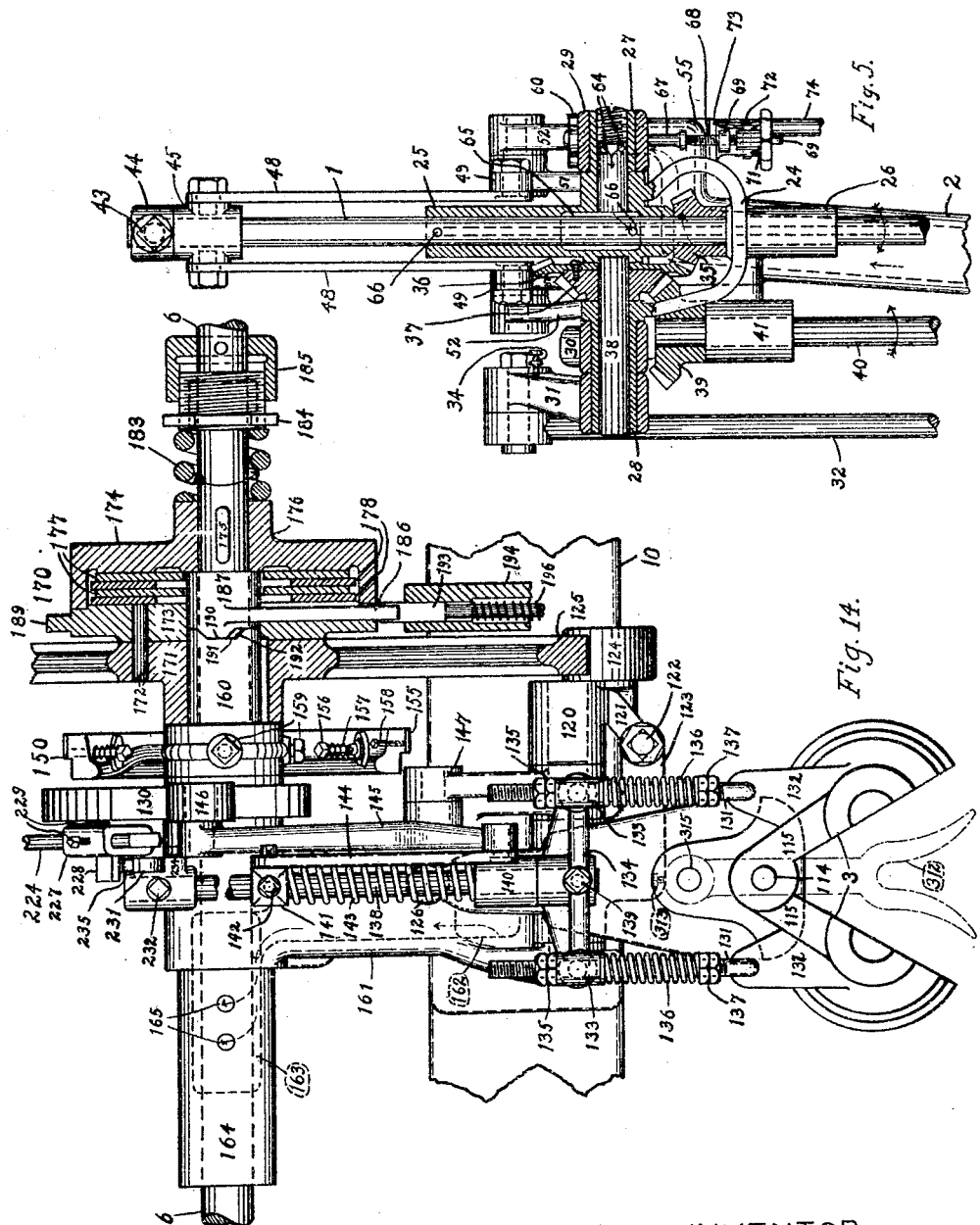
Figure 5 is a detail front elevation of the upper portion of the machine, certain parts being shown as in section at a vertical surface corresponding substantially to the line 5—5 in Figure 2.

On the upper end of the blow-iron 1 (see Figs. 1, 2, and 7) is secured (as by a set-screw 43) a collar 44 whose position may be altered as desired. Beneath this collar is a part 45 having a bore in which the blow-iron revolves freely. This part 45 is suitably connected to a lever 46 fulcrumed at 47 on the upper end of the structure 2. As shown, the connection is through links 48 whose upper ends are pivoted to the part 45 and whose lower ends are pivoted to the ends of the arms or forks 49 of the lever 46. One of the arms 49 is connected to the other arm 49 and to the rear arm 50 of the lever by a U-shaped web 51, and the bearings for the pivot pins or bolts 47 which form the fulcrum of the lever are in brackets 52 on the upper end portion of the structure 2. This construction will always permit the links 48 and the upper end of the blow-iron 1 to swing back close to the upper end of the structure 2 as shown in Fig. 4 when the blow-iron enters the furnace 4. By means of a rod or link 53 pivoted to its lower end and actuated as hereinafter described the lever 46 can be rocked to alter the longitudinal position of the blow-iron 1 with reference to the part or structure 24 in which it revolves without interference with any of its other movements.

Figure 6:
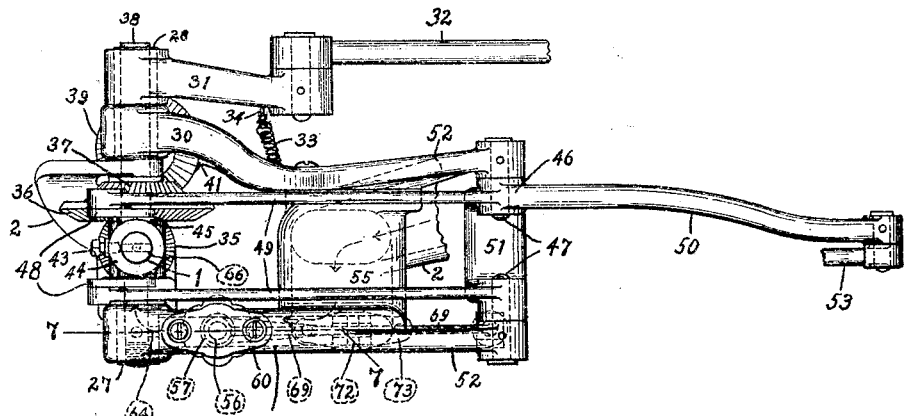
Figure 6 is a detail plan view of the upper portion of the machine.
Figure 7:
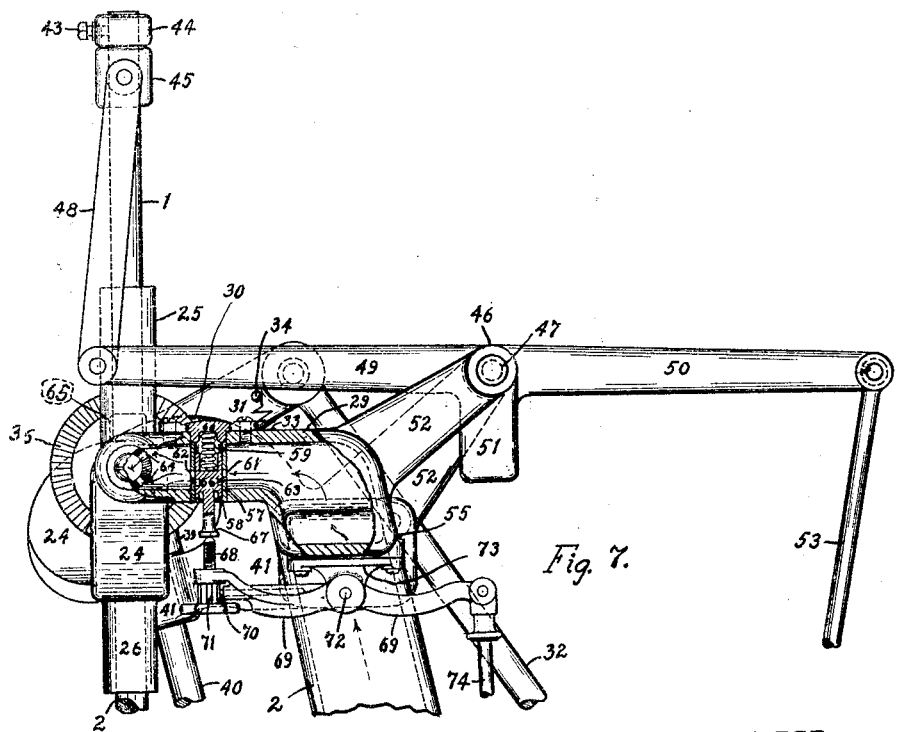
Figure 7 is a detail side elevation of the upper portion of the machine, certain parts being in section at a vertical surface corresponding substantially to the line 7—7 in Figure 6.

The column 2 is hollow, as will be seen from Figs. 6, 7 and others, and forms a conduit for the supply of air to the blow-iron 1, and, as shown, there is near its upper end an automatic relief-valve 54 (of any approved type) which may be set to aid in regulating the air-pressure according to the requirements of the work on the machine at any particular time. From the portion of the column 2 above the valve 54 the air passes across through the transverse horizontal portion of the irregularly bent extension or head 55 at its upper end and then again up and forward through the hollow horizontal bracket portion 29 to the air valve 56 (Fig. 7). This valve 56 is of cylindrical form and slides in a sleeve or liner 57 which fits in a vertical bore in the part 29 and completely blocks the passage therethrough. The valve 56 is urged downward against a shoulder 58 at the lower end of the sleeve 57 by a spring 59 interposed between its upper end and a cap 60 secured at the upper side of the part 29. As shown, there are ports 61, 62 opposite one another in the sides of the sleeve 57, and the valve 56 has an annular groove 63 which is adapted, when the valve is raised sufficiently, to overlap both these ports 61, 62 so that air may pass on through beyond the valve. The air which passes the valve 56 goes on to the forward end of the part 29 where the hollow shaft or trunnion 27 has its bearing and enters the trunnion 27 (the end of which is closed by a screw plug,) through holes 64 in its exposed side. From the trunnion 27 the air passes into a cavity 65 in the part 25, through which the blow-iron 1 extends, and thence it passes through one or another of a plurality of holes 66 into the bore of the blow-iron, these various holes being intended to allow for vertical adjustment of the blow-iron for the blowing of bulbs of different sizes and the like. As shown, the upper end of the blow-iron is solid or is plugged up in any suitable manner. A stem 67 depending from the valve 56 is engaged with the upper end of an adjusting screw 68 in one end of a lever 69, a spring actuated stop 70 carried by the lever 69 engaging a toothed wheel 71 on the screw 68 and serving to insure the maintenance of the proper adjustment. The object of the screw 65, it may be remarked, is to vary the extent and duration of opening of the valve 56 for a given movement of the lever 66. The lever 69 is fulcrumed on a pivot 72 in two depending lugs of a bracket 73 secured to the lower side of the part 55 and is actuated as hereinafter described through a link or rod 74 pivoted to it.

In the machine shown, the swinging movement of the part or structure 2 as a whole, the swinging movement of the blow-iron 1 with reference to it, and the longitudinal movement of the blow-iron are produced from the rear transverse shaft 12, while the rotation of the blow-iron, the actuation of the air valve 56, the operation of the mold 3, and various other operations are produced from the forward transverse shaft 6. The swinging movement of the column structure 2 as a whole is produced by a large cam 75 (see Figs. 1, 2, 3, and 4) whose periphery acts on a wheel or roller 76 pivoted on a rearwardly extending arm 77 of the structure 2. The swinging movement of the blow-iron 1 with reference to the structure 2 is produced by a smaller cam 78 which acts peripherally through a roller 79 on one end of an arm or lever 80 whose other end is fulcrumed at 81 on the column part 2, the lower end of the rod or link 32 already mentioned being pivoted to this lever at 82, and the spring 33 connected between the arm 31 and the structure 2 (Fig. 2) tending to keep the roller 79 always in contact with the cam 78. The longitudinal movement of the blow-iron 1 is produced by a third small cam 84 whose periphery acts through a roller 85 on one arm of a lever 86 fulcrumed at 87 on a bracket 88 which projects upward and forward from the left-hand end bearing of the shaft 12 (Fig. 2) and extends over the worm wheel 18, the other arm of this lever 86 being pivoted at 89 to the lower end of the rod or link 53 above mentioned.

To render the action of the cams 75, 78, and 84 clearer, I have in the diagrams forming Figs. 8 to 12 shown a number of the positions which these cams and the parts on which they act occupy during a complete cycle of operation of the machine, showing the periphery of the cam 75 in full lines, that of the cam 78 in dots and dashes, and that of the cam 84 in dotted lines,—indicating the other parts by full line center lines, the centers or pivots and bearings which are fixed on the framework 10 or on the structure 2 by small circles with cross marks, and the other centers by plain circles. Referring to these figures and to Figs. 1, 4, and 13, and first to Figs. 1, 8, and 13, it will be seen that a slight revolution of the rear transverse shaft 12 as indicated by the arrow will cause the roller 76 on the rear end of the arm 77 of the column structure 2 to pass from the largest circular portion 90 of the large cam 75 where it is shown in Figs. 1 and 13 to the slightly smaller portion 91 immediately following, where it is shown in Fig. 8, thus letting the structure 2 as a whole swing forward slightly, and will also cause the roller 79 on the rear end of the arm 80 to pass from the large concentric portion 92 of its cam 78 to the portion 93 immediately following (Figs. 8 and 13), so that the blow-iron 1 will under the action of the spring 33 itself swing forward with reference to the structure 2. The bulb on the lower end of the blow-iron 1 will thus be carried clear of the mold 3 (which will have been opened before the movements just described have taken place, as hereinafter set forth), and the neck of the bulb will be brought under the action of the mechanism 7 whereby the bulb is detached (Fig. 8). A slight further revolution of the shaft 12 and the cams 75 and 78 will not change the position of the column 2, but will cause the roller 79 to pass to the portion 94 of the cam 78 (Fig. 9) and allow the blow-iron 1 to swing still further forward until its end comes under the action of the mechanism 8 by which any glass adhering to it is cleaned off. Still further revolution of the shaft 12 and the cams will cause the roller 76 to leave the smaller concentric portion 91 of cam 75 and to move quickly inward over the portion 95 to the portion 96, which will allow the structure 2 to swing as far forward as possible (Fig. 10). Early in this movement of the structure 2 the spring 33 will by the corresponding movement of the cam 78 be allowed to swing the blow-iron 1 to its extreme forward position with reference to the structure 2, so that at the proper time the lower end of the blow-iron may enter the mouth of the furnace 4 (Figs. 4 and 10) and be dipped into the molten glass therein. Before the conclusion of this forward swing of the structure 2 the roller 79 will be lifted out of contact with the cam 78, as will be seen from Figs. 4 and 10: but this is of no consequence because the spring 33 will bring the blow-iron 1 to a perfectly definite extreme forward position with reference to the column 2.

The continuing revolution of the cam 75 will allow the structure 2 to remain in its extreme forward position with the blow-iron 1 in the glass in the furnace 4 (Figs. 4 and 10) but a very short time,—just long enough, in fact, for the blow-iron to gather a batch of glass,—for the action of the portion 97 of the cam 75 on the roller 76 will almost at once cause the structure 2 to swing rapidly back toward the position shown in Fig. 11. Early in the travel of the roller 76 over the cam portion 97 the roller 79 will have returned to the cam 78 and be in contact with the relatively flat side thereof, and during the subsequent portion of such travel the backward swing of the structure 2 and the action of the forwardly moving portion 98 of the cam 78 will combine to make the blow-iron 1 itself move back very rapidly toward its position in Fig. 11 so as to allow the glass but little time to cool. As the portion 99 of the cam 75 is reached by the roller 76 and the backward movement of the blow-iron 1 becomes less rapid (Fig. 11), the charge of glass on the end of the blow-iron will come under the action of the marvering device 9 (if one is employed) which will if necessary bring it to more nearly or exactly the proper form for blowing, as already mentioned.

As the roller 76 passes over the portion 99 of the cam 75 and, on further revolution of the shaft 12, on to the large concentric portion 90 where it started, the portion 100 of the cam 78 will, of course, swing the blow-iron 1 still further back toward the structure 2 and the vertical position shown in Fig. 1. During the latter portion of this movement the roller 85 on the rocker 86 will leave the small concentric portion 101 of the small cam 84 where it has been riding during the movements of the other parts above described and reach the portion 102 of said cam, which will cause the rocker 86 to act through the rod 53 and the other parts already described to lift the blow-iron 1 with reference to its axis 5, and thus the lower end of the blow-iron with the charge of glass thereon will in its final backward swing clear the cleaning off device 8 and the detaching device 7, as shown in Fig. 7. The further revolution of the shaft 12 and the cams 78 and 84 will cause the roller 79 to ride upon the large concentric portion 92 of the cam 78, where it started, and the roller 85 to traverse the portion 103 of the cam 84, and return to the concentric portion 101, and thus the blow-iron 1 will swing back to a vertical position (Fig. 1) and will descend quickly until the charge of glass on it enters the mold 3, which (as hereinafter described) will have been brought into proper position and will be held open to receive it. The ending of this rapid descent of the blow-iron when the charge of glass enters the mold 3 may by giving the cam 84 the form shown be made rather abrupt, which will elongate the charge somewhat and so complete its preparation for blowing. Thereafter for about half a revolution of the shaft 12 the various rollers will ride idly upon concentric portions of their respective cams and the structure 2 and the blow-iron 1 will remain in the position which they occupy in Fig. 1, and during this period of rest the closure of the mold 3 about the charge of glass, the blowing of the charge into a bulb, and the opening of the mold for the removal of this bulb therefrom will occur,—all as hereinafter described.

Referring, now, to the operations for which power is derived from the forward shaft 6 and, first, to the rotation of the blow-iron 1, it will be seen that at one end of the shaft 6 there is a sprocket wheel 105 (Figs. 1, 2, and 3) which acts through a chain 106 to drive a sprocket wheel 107 on one end of a short shaft 108 having its bearing in a sleeve portion 109 of the bracket 42 on the column 2. On the other end of this shaft 108 is a bevel gear 110 which meshes with a bevel gear 111 at the lower end of the upright shaft 40 which rotates the blow-iron through the train of gearing already described. It will readily be seen, therefore, that both the swinging of the structure 2 about its axis 6 and the swinging of the blow-iron 1 about the axis 5 may take place without any effect upon the rotation of the blow-iron except a slight acceleration, or retardation, which is of no practical consequence, and equally without interference with the movements of various other parts.

Referring, now, to Figs. 1, 2, 3, 4, 13, and 14, it will be seen that the mold 3 shown comprises two sections hinged together, as it were, on a pivot 114, these sections having rearwardly extending lugs 115 through which the pivot 114 passes. The pivot 114 is mounted on a structure 116 which is itself pivoted at 117 between lugs 118 on a portion 119 of the framework of the machine,— these lugs appearing in Fig. 2, in which the structure 116 and many of the parts associated with it are omitted. To the right-hand one of these lugs 118 (Fig. 2) is also pivoted an arm 120 on the front side of which is a lug 121 which affords bearing for a screw 122 in a lug 123 on the structure 116. At the lower end of the arm 120 is a roller 124 which is acted on by the periphery of a large cam 125 on the shaft 6. This cam maintains the mold 3, the structure 116, and the parts associated with them in the positions shown in Figs. 1 and 13 with a lug 126 at the rear of the structure 116 against a suitable abutment 127 on the frame structure 119 (Figs. 2, 13, and 14) during the greater part of its period of revolution, including that in which the blowing operation occurs. After the blowing is completed, the cam 125 allows the mold 3 and various other parts to swing down into the positions where for the sake of illustration they are shown in Fig. 4 and remain awhile with the mold immersed in a vessel of cooling water (not shown), and then raises them into position for the blowing of another bulb. It is to be understood, however, that in the operation of the particular machine illustrated the column 2 is in its upright position shown in Fig. 1, while all this is taking place, not swinging forward into the position where it is shown in Fig. 4 until after the mold has been dipped in the cooling water and restored to the position where it is shown in Figs. 1 and 13.

The opening and closing of the mold sections is effected by a cam 130 on the shaft 6 through a resiliently yielding connection which insures that when closed they shall come tightly together. As shown, (Figs. 13 and 14) there are two rods or links 131 which have hooked forward ends engaged in holes in lugs 132 on these sections and which pass through sleeves 133 pivoted at the extremities of a yoke-like part 134 and have locknuts 135 on their rear ends, and springs 136 are interposed between the sleeves 133 and lock-nuts 137 in front of the sleeves 133. The lock-nuts 135 and 137 allow the effective length of the rods 131 to be altered and adjusted and the resistance of the connection of which they form a part to be varied. The yoke 134 is secured on a rod 138 (as by a set-screw 139) which is adapted to slide through a sleeve 140 on the structure 116. A part 141 is secured on the rod 138 (as by a set-screw 142,) so as to be adjustable in position, and a spring 143 is mounted on the rod between the sleeve 140 and the part 141. This spring 143, it will be seen, is constantly urging the rod 138 and the yoke 134 back toward the positions shown in Figs. 13 and 14, so that the mold 3 always tends to open. The part 141, however, is connected by a link 144 pivoted thereto with one arm of a rocker 145 whose other arm carries a roller 146 and which is pivoted at 147 to a lug on the frame structure 119. The cam 130 acts through this rocker 146 and the various other parts to close the mold 3 when the charge of glass on the blow-iron 1 has been brought into it and allows the spring 143 to open the mold when the blowing has been completed,—the mold being open when the roller 146 is in contact with the smaller concentric portion of the cam 130 (Fig. 13) and being closed when it is in contact with the larger concentric portion of said cam. The parts 131, 134, 138, 144, 145, etc., swing forward with the structure 116 as already described (see Fig. 4) after the mold 3 has opened in consequence of the roller 146 passing from the large concentric portion of the cam 130 to its small concentric portion and return to their "upright" positions before it is time for a fresh charge of glass to come into the mold 3 and for the latter to be closed,—the roller 146 leaving the small concentric portion of the cam 130 and returning to it while the cam 130 continues to revolve with the large cam 125 (Fig. 1) which raises and lowers the mold.

The air valve 56 and the passage of air through it and into the blow-iron 1 have already been described. This valve 56 is controlled and operated by a cam 150 on the shaft 6 which acts peripherally through a roller 151 on one arm of a rocker 152 pivoted at 153 on a bracket 154 secured to the column 2, the other arm of this rocker being pivoted to the rod or link 74 already described. The cam 150 is so designed and arranged with reference to the cams 125 and 130 that while the mold 3 is maintained upright and closed by the cams 125 and 130 it acts upon the rocker 152 to pull the rod 74 downward and open the air valve 56 against the resistance of its spring 59 (Fig. 7) and allows it to be closed again by said spring. The cam 150 has a separate acting face portion 155 consisting of a strip of metal thin enough to be more or less resilient or yielding. As shown (Figs. 13 and 14), there are a number of large headed studs or bolts 156 which extend through holes in the fixed rim portion of the cam and are screwed into the face portion 155 or otherwise fastened to it, and coiled springs 157 are interposed between the fixed rim portion of the cam and the heads of the bolts or pins 156 and serve to support the face portion 155 elastically. Adjusting screws 158 are threaded through holes in the fixed portion of the cam rim, and by means of these screws the form of the acting face of the cam can be varied to insure the supply of air to the blow-iron 1 in the manner most suitable for the blowing of the particular article that it is desired to produce, as described in my Patent No. 813,289 and my application Serial No. 507,056 above mentioned. The cam 150 can be adjusted angularly with reference to the cams 125 and 130 by loosening up the set-screws 159 by which it is held fast on a sleeve 160 to which they also are secured.

While the air may be introduced into the column 2 in any desired manner, it is advantageous to make the principal portion of the frame-work 10 hollow and utilize it as a reservoir for steadying the air pressure and to have the air pass therefrom into the column 2 where the latter has its bearing about the shaft 6. It is also preferable not to subject the shaft 6 to the strain of supporting the structure 2 and the parts carried by it, but to provide them with a bearing on some part of the framework of the machine. As shown in Figs. 2, 4, 13, and 14, the shaft 6 extends through a conduit portion 161 of the structure 119 already referred to as forming part of the frame-work 10, and this hollow portion 161 communicates with the interior of the main portion of the frame-work 10 at 162, so that the air passes up therethrough to an annular chamber 163 therein about the shaft 6. This chamber 163 extends to the left (Figs. 2 and 14) into a projecting cylindrical journal portion 164 of the structure 119, 161 on which the structure 2 is directly mounted. As shown, there are a plurality of holes 165 in the upper side of the journal 164 through which the air passes from the chamber 163 directly into the interior of the column 2. The air may enter the hollow main portion of the frame-work 10 through the hole 166 (Fig. 3), and may be supplied by any convenient means,—such, for example, as a blower or compressor (not shown), which may be mounted on the rearwardly extending portion 167 of the frame-work 10 and driven by a belt from the pulley 168 on the shaft of the motor 13.

The machine has so far been described as though the shafts 12 and 6 and the cams 75, 78, 84, 125, 130 and 150 revolved continuously. Since, however, the operations produced by the cams 125, 130, and 150 on the shaft 6 will in the machine shown only occur in the period of about half a revolution of the cams 75, 78, and 84 on the shaft 12 during which the concentric portions 90, 92, and 101 of these cams are acting on the parts 2 and 1 which they control and keeping them stationary in the positions shown in Fig. 1, and since it is practically convenient to have the cams 125, 130, and 150 of a simple form such that they will perform the complete cycle of operations necessary for the blowing of a bulb once in a revolution, it is more convenient for these cams 125, 130 and 150 to remain stationary during the half revolution of the cams 75, 78, and 84 in which the various movements of the column 2 and the blow-iron 1 occur. In the machine shown, this is brought about by allowing the shafts 12 and 6 to revolve continuously and making the shaft 6 revolve twice for each revolution of the shaft 12,— the bevel gear 19 (Figs. 1, 2, and 3) being twice as large as the bevel gear 20 and the bevel gears 22 and 23 of the same size,—and by connecting the sleeve 160 to which the cams 125, 130, and 150 are secured to the shaft 6 so as to revolve with it one revolution and disconnecting it and allowing the cams to remain stationary during the next revolution.

As shown, this connection of the part 160 and the cams thereon to the shaft 6 is effected by a multiple disk clutch 170. (See Fig. 1, 2, 3, 14, 15, and 16.) The hub 171 of the cam 125 is secured by pins 172 to a part 173 which is one of the driven members of this clutch 170 so that the sleeve 160 and all the cams thereon are practically one part with this part 173 (Figs. 14 and 15), and a casing part 174 which forms one of the driving members of the clutch is secured on the shaft 6 so that it is constrained to turn therewith but is free to move lengthwise thereon,—as by the engagement of a key 175 on the shaft 6 in a keyway (not shown) in the hub 176 of the casing part 174. The other disk members 177 and 178 which lie between the acting faces of the members 173 and 174 are in a general way like large flat washers, and alternate ones (177) of them are connected with the part 173 and the rest (178) with the part 174. These parts and their relation to one another are best shown in Figs. 15 and 16, the former of which is a view of the part 173 as it appears from the right of the line 15—16 in Fig. 14, the parts 174, 177, 178, etc., being removed, and the latter of which is a view from the left of the line 15—16 of the parts 174, 177, 178 and others associated with them in their operating positions, certain parts being in section along the line 15—16. As shown in these figures, there are lugs 179 projecting from the inner face of the part 173 and lugs 180 on the interior of the cylindrical portion of the casing part 174. The disks 177 are of such a size that the casing can revolve freely about them without interference from the presence of the lugs 180; but the lugs 179 engage in notches 181 extending outward from the circular portions of their central openings. The disks 178 are larger, and have peripheral notches 182 in which the lugs 180 engage; and their central openings are so large that the disks can revolve freely about the lugs 179. The casing part 174 is constantly urged toward the part 173 by a spring 183 between the hub 176 of the part 173 and an abutment 184 which is made adjustable by being threaded into a cup-like part 185 fast on the shaft 6, so that the clutch 170 tends to "set" itself. The setting of the clutch 170 is, however, controlled by a part 186 which comprises a hub portion 187 that fits loosely on the shaft 6 between the end of the sleeve 160 and the inner side of the casing 174 and a shank portion that lies in a depression 188 in the inner face of the part 173 and projects beyond the circumference of the part 174 a distance equal to the width of a cam flange 189 that extends part way around the part 173. On the end of the hub 187 adjacent the end of the sleeve 160 is a projection 190 with inclined faces that is adapted to fit in a similarly shaped but wider depression 191 in the end of the sleeve 160 and allow the clutch to set or to ride outward on the inclined face 192 of the depression 191 and open the clutch. The depression 188 is wide enough to allow the part 186 a limited turning movement with reference to the part 173 and the sleeve 160 just about sufficient to operate the clutch.

From Figs. 1, 14, and 16 it will be seen that adjacent the clutch 170 there is a bolt or stop 193 which slides in a sleeve 194 on a bracket 195 on the frame-work of the machine and is urged forward into the path of the projecting outer end of the part 186 by a spring 196 in said sleeve. When the parts are in the condition of rest indicated in Figs. 14 and 16, this stop 193 is engaged beneath the outer end of the part 186 and the latter is thereby caused to occupy its full line position in Fig. 16 at the upper side of the depression 188, where it will hold the clutch 170 open and keep the driven parts 173, etc., stationary. When, however, the bolt 193 is drawn back, its weight and the friction with the shaft 6 and the pressure of the spring 183 on the inclined faces of the parts 160 and 187 at 192 will cause the part 186 to swing down as indicated in dotted lines in Fig. 16 and allow the clutch 170 to set, and thus the part 173, the sleeve 160, and the cams 125, 130, and 150 will be started into revolution. When this has happened, the bolt 193 will be held back for a time by the cam flange 189; but it will subsequently ride down and off the inclined end of this flange into the path of the part 186 as the latter comes around toward its initial position, and so finally engage it and cause the momentarily continuing revolution of the parts 160, 173, etc., to throw out the clutch. Thus one complete revolution of the shaft 6 and one operation of the mold 3 and the air-valve 56 for the blowing of a bulb will take place each time the bolt 193 is drawn back.

Figure 2:
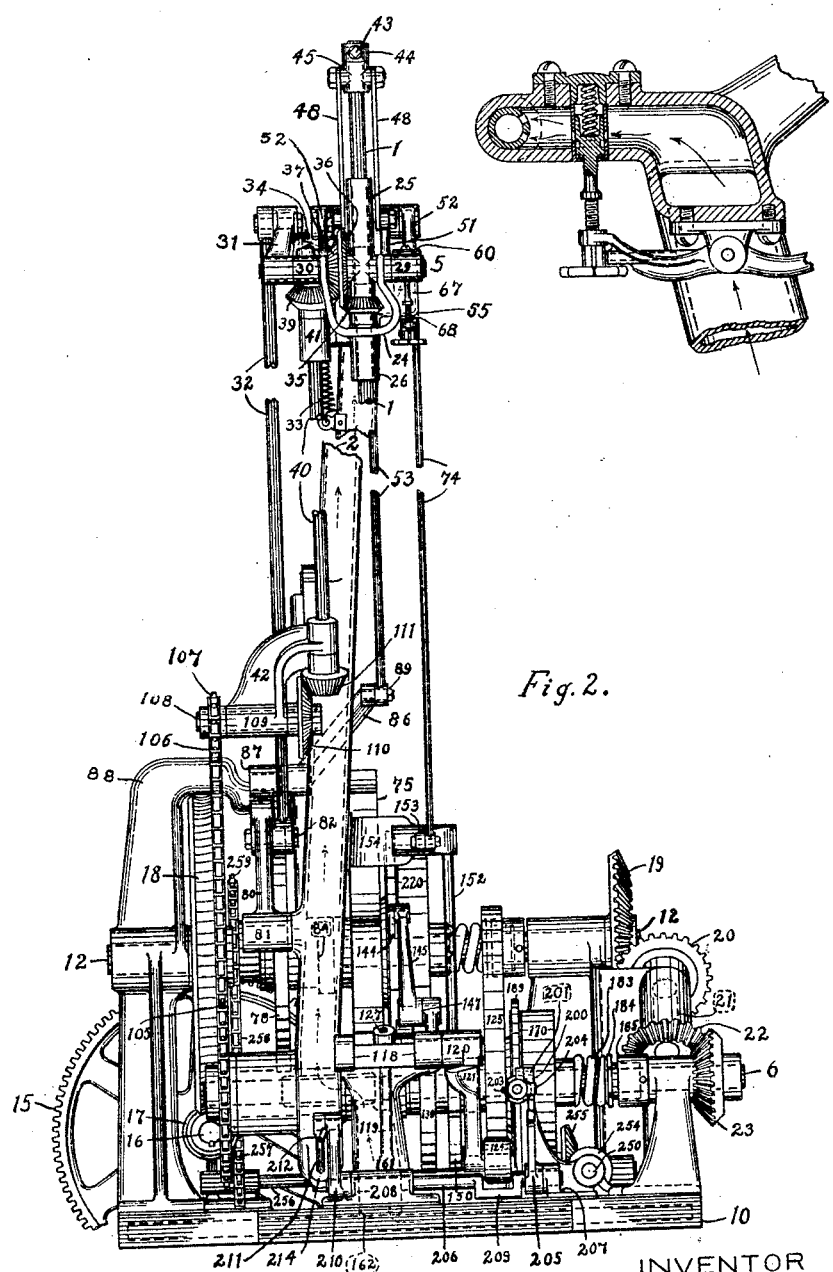
Figure 2 is a front elevation of the main portion of the machine, certain parts and mechanisms being removed or omitted, and the intermediate portions of certain parts being broken away as in Figure 1.

In the machine shown, the drawing back of the bolt 193 is produced by the column 2 itself just as it is reaching its position shown in Figs. 1 and 13 at the end of its backward swing after the gathering of a batch of glass and just as the charge of glass on the blowiron 1 is entering the mold 3. As shown in Figs. 1 and 2, there is a latch or dog 200 pivoted at 201 on a part 202 secured (as by a set-screw 203) at the rear end of the bolt 193. This latch 200 is kept from swinging backward from the position shown in Fig 1 by a portion 204 of the part 202 which lies behind it, but is free to swing forward. The latch 200 cooperates with a finger 205 secured to a shaft 206 near its right hand end (Fig. 2), this shaft 206 being mounted in brackets 207 and 208 on the frame-work 10 and having a double crank offset portion 209 to allow the roller 124 to swing over it. At the left-hand end of the shaft 206 is secured an arm 210, and on the end of this arm 210 is pivoted a short "push-rod" 211 (Figs. 2 and 13). This push-rod member 211 is kept up in the somewhat sloping position shown by a spring 212 on one end of which it rests (the other end of said spring being secured to the rear edge of the arm 210 by screws 213) so that its rear end is held against the lower side of the bottom of the column 2 in the path of a shoulder or lug 214 thereon. When the bolt 193 is beneath the part 186 as shown in Fig. 16 and the parts driven or operated through the clutch 170 are at rest during the forward swing and return of the column 2, the front edge of the finger 205 engages the rear edge of the latch 200. As the column 2 is just coming back to its rearmost position after the gathering of a batch of glass on the blow-iron 1 and this batch of glass is about to enter or entering the mold 3, the shoulder 214 will strike the end of the push-rod 211 and act through the parts 211 and 210 and the shaft 206 to swing the finger 205 forward from this position and draw forward the bolt 193 from under the part 186, and the part 186 will drop downward (Fig. 16) and the cams 125, 130, and 150 will start to revolve, as already described. Just after the bolt 193 is fully withdrawn from beneath the part 186, the finger 205 will trip past the end of the latch 200 and so leave the bolt 193 free to return to its initial position as soon as the cam flange 189 will allow it to do so. The finger 205 and the parts connected with it will remain in the positions indicated in Fig. 1 until the mold 3 re-opens after the blowing has been completed and the column 2 swings forward with a blown bulb on the blow-iron 1, when in consequence of the weight of the parts 210 and 211 the finger 205 will trip back past the latch 200 into its initial position, ready for the return of the column 2 after a fresh gathering of glass has occurred,—the latch 200 swinging to the right to permit this quite freely.

It has thus far been in a manner assumed that the cams 75, 78, and 84 are fast on the shaft 12. Since the throwing in of the clutch 170 which controls the operation of the mold 3 and the supply of air to the blow-iron 1 is produced by the column 2 itself at the proper time, the machine would operate satisfactorily under these conditions provided that after the clutch 170 had been thrown in no slipping thereof occurred. There is, however, always a possibility that this clutch 170 may slip (it being, indeed, expected to slip and prevent injury to the machine in case any of the parts driven through it should be blocked in any way); and with the cams 75, 78, and 84 fast on the shaft 12 such slipping would probably result in the blow-iron 1 being swung forward before the mold 3 was opened and a bulb being consequently spoiled. For this and various other reasons, therefore, it may be preferable to make the connection between the cams 75, 78, and 84 and the shaft 12 a yielding one, and to arrange that it shall be effected or become operative only when the mold 3 is open. Accordingly, these cams 75, 78, and 84 are in the machine shown mounted and secured together on the shaft 12 in a manner very similar to that in which the cams 125, 130, and 150 are mounted on the shaft 6, as above described, and are in like manner connected to the driven member of a clutch 220 on said shaft 12 (Figs. 1, 3, and 13) which is constructed like the clutch 170 and is actuated as a result of the rearward movement of the mold operating rod 138 which accompanies the opening of the mold 3. As will be seen from Fig. 13, the bolt or stop 221 which co-acts with the operating member 222 of the clutch 220 has on its rear end a pin 223 whose protruding ends are engaged in slots in the sides of a fork at the lower arm of a rocker 224 pivoted at 225 on a bracket portion 226 of the frame-work of the machine,—this bracket also comprising the sleeve in which the bolt 221 slides. On the upper arm of the rocker 224 (Figs. 13 and 14) a part 227 having thereon a projection or shoulder 228 is secured by one or more set-screws 229 which allow it to be adjusted along said arm. On the rear end of the mold operating rod 138 a part 230 which has on it a latch 231 similar to the latch 200 is secured by a set-screw 232. This latch 231 is pivoted at its lower end on a pin 233, and a shoulder or lug 234 on the part 230 prevents this latch 231 from swinging forward beyond the position in which it appears in Fig. 13, while another projection 235 on the part 230 prevents it from swinging back more than a certain distance such that under the influence of gravity it will always tend to return to its forward position shown in Figs. 13 and 14. When the mold 3 is closed, the shoulder 228 will be behind the latch 231 as shown in Fig. 14 or even somewhat farther behind it than it appears in this figure,—the parts 224, 227, 230, etc., being arbitrarily shown in Fig. 14 in positions which do not correspond to those of the mold 3 and other parts there shown, in order that they may be more clearly visible, and the rod 140 being shown with an intermediate portion broken away in order that the parts 224, 227, 230, etc., may appear within the limits of the drawing.

When, however, the mold operating rod 138 moves back and opens the mold 3, the corner of the latch 231 will engage the shoulder 228 and swing the upper arm of the rocker 224 back a sufficient distance to cause the bolt 221 to release the operating member 222 of the clutch 220 (this being the event shown in Fig. 13) and initiate a revolution of the cams 75, 78, and 84 with the shaft 12. Before the conclusion of its rearward movement, the latch 231 will trip past the shoulder (in a manner similar to the tripping of the finger 205 past the latch 200 of the operating mechanism of the clutch 170) so as to leave the rocker 224 free to swing back to its original position above described as soon as the mechanism of the clutch 220 permits the bolt 221 to move forward into the path of the member 222 again. When, on the other hand, the operating rod 138 subsequently moves forward to close the mold 3 after the charge of glass on the blow-iron 1 has been introduced thereinto, the latch 231 will swing back and trip past the shoulder 228 so that it may be in a position to re-engage this shoulder and actuate the bolt 221 when the mold 3 is again opened.

In starting the machine, it may be necessary to set one or the other of the clutches 170 and 220 by hand, depending upon the position in which the machine was left when power was last shut off; but when the machine has once been started it will under normal conditions continue to run indefinitely without further attention, each of the clutches 170 and 220 being thrown in and out automatically at the proper time as above described. So long as there is no slipping of either clutch, the cams 75, 78, and 84 will revolve practically continuously with the shaft 12, since the rearward movement of the mold operating rod 140 will occur once in each two revolutions of the shaft 6 and therefore once in each revolution of the shaft 12. If, on the other hand, either clutch slips, the presence of the other will prevent premature movement of any of the parts of the machine and spoiling of the work on it; while if any of the parts driven through either clutch becomes blocked, its presence will save the machine itself from damage.

While the manner in which the blow-iron is mounted (already described in connection with Figs. 5, 6, and 7) is such that in some cases it may be practicable and desirable to dispense with it, a fork or other suitable guiding means 312 more or less similar to that shown in my Patent # 813,289 and in my application Serial No. 507,056 may be arranged as shown in dot and dash lines in Figs. 13 and 14 to guide the blow iron 1 as the charge of glass thereon enters the mold 3 and to maintain the blow-iron in proper position while the blowing operation is going on. As shown, this fork is adjustably secured (as by a set-screw 313) on a rod or standard 314 which is mounted in a hole 315 in the structure 116, a short distance behind the pivot 114 and, as shown, is secured therein by a pair of nuts.

In the machine shown, the devices or mechanism 7, 8, and 9 by which the blown bulbs are detached from the blow-iron 1 and the blow-iron is cleaned off etc. are arranged in front of the portion of the machine that has been described in detail above and are mounted on frame structures 800 and 900 separate from the frame-work 10 (Figs. 1 and 3). Such of these mechanisms as may require it receive power from a longitudinal counter shaft 250 which extends from a bearing in a bracket 251 of the frame-work 10 to a bearing in a bracket 252 on the frame-work 900,—the shaft 250 being for convenience in moving the machine made in sections which are connected together by a coupling 253,—and is driven from the main transverse shaft 12 at the rear of the machine. As shown, there is at the rear end of the shaft 250 a bevel gear 254 which meshes with a bevel gear 255 at one end of a transverse shaft 256 having its bearings in brackets on the frame-work 10, and this shaft 256 has on it a sprocket wheel 257 which is driven through a chain 258 from a sprocket-wheel 259 near one end of the shaft 12 (Figs. 1, 2, 3, and 4), the relative diameters of the gears 254 and 255 and of the sprockets 257 and 259 being such that the shaft 250 revolves at a considerably greater speed than the shaft 12.

The device for detaching the bulbs shown in Figs. 1, 3, 17, 18, and 19 comprises a wheel 701 having in a groove in its a periphery a circumferential band 702 of porous material (asbestos, for example), preferably somewhat yielding, which is kept more or less moistened or saturated with water by revolving in contact with a sponge 703 in a vessel of water 704 arranged beneath the edge of the wheel. In the device shown, the wheel 701 is not positively driven, but is merely mounted loosely on a more or less nearly upright shaft or standard 705. As the blow-iron 1 swings forward, the revolving neck of the blown bulb thereon will come in contact with the periphery of the wheel 701 and cause it to revolve, and so will be wet all the way around by the band 702. The resultant chilling of the heated glass will cause a strain in it which will result in the cracking off of the bulb, which may be removed by an attendant or taken care of by any suitable means arranged in position to receive it. Provision is made for the adjustment of the edge of the wheel 701 laterally with respect to the path of the blow-iron 1 and the bulb thereon to insure that the neck of the bulb shall be in contact with the periphery of the wheel a suitable length of time and secure proper action irrespective of variations in the size of the bulb neck; as shown, this is accomplished by making the shaft or standard 705 in two parts or sections one having a forked end and the other a flattened portion pivoted therein by a bolt 706 the nut on which can be tightened to clamp the parts in any desired relative angular position. Provision may be made for vertical adjustment of the wheel 701 by mounting the lower section of the standard 705 in an upright barrel 707 on the frame-work 700, a set-screw 708 serving to secure the standard 705 at the desired height in said barrel.

If the character of the work done on the machine is such as to render it desirable, the breaking of the bulb neck with certainty or at just the right time may be assured by a sharp tap or blow on the blow-iron or on the neck of the bulb given by an attendant or by any suitable automatic percussive device. In Figs. 18 and 19 the detaching mechanism 7 is shown as embracing a simple automatic device 710 suitable for this purpose. This mechanism 710 comprises a part 711 mounted so as to swing about a pivot 712 and strike the blow-iron 1 shortly after the neck of the bulb has come in contact with the periphery of the wheel 701. In the particular mechanism shown, the action of the striker 711 at the proper time is caused by the blow-iron 1 itself, and all the power required is obtained from the swinging movement of the blow-iron. As will be seen from Fig. 18, there is a tripper part 713 (shown as consisting of a portion of the striker 711 itself) whose rear edge lies diagonally across the path of the blow-iron 1 past the wheel 701, the arrangement of the parts being such that the blow-iron 1 engages this edge of the part 713 at about the time when the neck of the bulb is in contact with the periphery of the wheel 701. As the blow-iron 1 continues to swing forward, it forces the part 711 back toward the position shown in dotted lines in Fig. 18 and in full lines in Fig. 19. About the time when the neck of the bulb has left the periphery of the wheel 701 the blow-iron 1 trips past the corner of the part 713, as indicated by the dotted circle 714, and thereupon a spring 715 connected between a pin 716 on an arm 717 of the part 711 and a stationary pin 718 causes the part 711 to fly back and strike the blow-iron as indicated by the dotted circle 719 in Fig. 18. As shown the forward swing of the part 711 is finally limited by a lug 721 on the arm 716 coming against an adjustable screw abutment 722 in a stationary lug 723; but the adjustment of the abutment 722 shown is such that without some lateral yielding or displacement of the blow-iron 1 the part 711 could not reach the position in which it finally comes to rest until after the blow-iron 1 had moved on past the outer end 724 of the part 710, so that the striking of a full, free blow upon the blow-iron is insured. Of course the weight of the part 711 and the strength of the spring 715, etc., will be proportioned according to what is necessary for the particular work on the machine and may be altered from time to time. While the blow dealt the blow-iron should preferably be sharp and quick, yet for many classes of work very little actual force is required.

Provision may be made for affording the blow-iron 1 lateral support during its interaction with the portion of the machanism 710 above described by mounting a stationary bearing or slide 725 above the wheel 701 on a prolongation or extension of the standard 705. According to its position and the length of its face 726, this bearing part 725 may support the blow-iron 1 during the impact and contact of the striker 711 therewith or during its contact with the trip 713, or both,—the drawing showing it as supporting the blow-iron 1 from the time when it first comes in contact with the part 713 until it reaches a point where lateral displacement under the action of the spring 715 could no longer affect the action of the wheel 701 upon the neck of the bulb but leaving the blow-iron unsupported when the blow of the part 711 is delivered, so that so far from impairing the action of the wheel on the bulb neck the parts 711 and 725 together rather serve to insure that it shall be thorough and definite. In Fig. 19 the bearing part 725 is shown a little below the part 711; but it will be understood that it can be vertically adjusted by loosening a set-screw 727 by which it is secured on the standard 705 or by elevating the standard 705 in the sleeve 707, or both. In Figs. 18 and 19 (as well as in Figs. 3 and 17), the wheel 701 is shown a little further from the path of the blow-iron 1 than in practice it would probably ever be, in order to avoid confusion of the drawing; and accordingly the part 725 is shown in Figs. 18 and 19 as broken at about its middle in order that the portion thereof with which the blow-iron 1 engages may appear in its proper position with reference thereto. The parts 711, 713, and 715 have their edges or faces with which the blow-iron 1 comes in contact somewhat rounded, as shown, in order to secure a smooth sliding and allow for adjustments in which these parts may be tilted with reference to the blow-iron. The moving parts 711, etc. may be arranged on either side of the path of the blow-iron 1 with reference to the wheel 701: as shown, they are arranged on the opposite side from the wheel 701 and are all mounted (along with the stationary parts 716, 722, and 723) on the arm 728 which is secured at the upper end of a standard 729 similar to the standard 705, this standard being mounted in a sleeve 730 on the base 800.

After the bulb has been removed by the detaching mechanism 7 as above described, the blow-iron 1 comes under the action of the cleaning-off mechanism 8 (Figs. 1, 3, 9, and 17). As shown, this mechanism comprises a pair of scrapers or jaws 801 which reciprocate more or less rapidly and also tend to come together or approach each other more or less closely, and act to crack, break, and scrape off any glass still adhering to the blow-iron 1 when it comes between them. The scrapers 801 shown in Figs. 1, 3, and 17 have substantially parallel horizontal bevelled edge portions 802 of considerable length, but in general form and arrangement they are very much like the jaws of a pair of ice-tongs held up-side down. As shown, they are pivoted at 803 on a part 804 which is adapted to slide up and down on two upright guides or standards 805 which are mounted in barrels 806 on the base 800 and can be secured at any desired height therein by set-screws 807. As will be seen from Figs. 1, 3, and 17, the part 804 comprises two sleeves through which the standards 805 extend and a web connecting them, and the portions of the jaw members 801 through which the pivot 803 passes are mounted in slots in this web at opposite sides of a lug portion 808 thereof,—there being, as shown, a hole clear through the web for the pivot 803 and also corresponding holes 809 in the outer sides of the sleeves which facilitate the insertion of this pivot. As will be seen from Figs. 1 and 17, the "handle" ends of the jaw members are connected by link parts 810 which in form resemble tuning forks to a part 811 more or less similar to the part 804 above mentioned. This part 811 is also mounted on the guides or standards 805 so that it may slide on them, the ends of the link members 810 being pivoted to the ends of the jaw members 801 at 812 and to arms or brackets 813 on the part 811 at 814. The tendency of the jaws to close is in the particular machine shown produced by springs 815 which are shown as arranged on the standard 804 between the parts 803 and 811. The parts above described are reciprocated vertically by an eccentric 816 which is mounted on a shaft 817 having its bearing on a bracket on the base 800 and driven from the shaft 250 through bevel gears 818 and 819, the upper end of the eccentric rod 820 being pivoted to the part 811 at 821. Provision may be made for adjustment of the length of the eccentric rod 820 to enable the range of movement of the vertically reciprocating parts to be shifted if the exigencies of the work on the machine require it,—as shown by making it in two telescoping sections which can be secured in any relative position desired by a set-screw 822. The springs 815 will most ordinarily, perhaps, be so proportioned with reference to the weight and inertia effect of the various parts and to the rate of revolution of the shaft 817 that they will just a little more than fully counterbalance the weight of the parts 801 and 803 and that the jaws 801 will more or less completely open and close with each reciprocation; but they may, of course, be made of whatever strength is found to give the best results for the particular work on the machine and the conditions of operation, etc. To facilitate the entry of the blow-iron 1 between the jaws 801, the corners 823 of their acting edges or faces 802 may, if found advisable, be rounded somewhat, as indicated in Fig. 18.

I will now describe the preparatory shaping or marvering of the hot glass according to my new method,—for the sake of making clearer the distinctive features of my method first briefly describing the ordinary practice of hand marvering. I will then describe several forms of mechanism which I have devised for carrying out my method.

In the manufacture of bulbs by hand, the operator sticks the end of the blow-iron in the molten glass in the furnace and gathers a ball or "batch" of glass thereon. He brings this batch of glass to the shape which he knows by experience will give the desired proper distribution of the glass in the walls of the blown article by rolling it back and forth on a flat topped iron table known as a marvering table. This he does by revolving the blow-iron between his hands,—usually first in one direction and then in the other,—varying the angle of the blow-iron with reference to the surface of the marvering table during the operation as may be necessary.

According to my method of "marvering," the batch of glass is shaped by relative turning or rolling movement of the glass and one or more surfaces which give it any desired form, without the shifting of the axis of rotation which the hand operator resorts to in order to produce anything but a simple cylindrical or conical formation. According to this method, also, it is practicable to effect all the deformations or "reformations" of the body of glass that may be necessary to secure the shape desired simultaneously, and, in general, by a single relative turning or rolling movement of the glass and the part or parts comprising the surface or surfaces by which the shape of the glass is changed. It is very advantageous to duplicate the surfaces in question on opposite sides of the mass of glass; and if the glass is in a strict sense rolled between these surfaces, one or both of them will naturally move in a direction transverse to the axis of rotation of the body of glass and of the blow-iron (either from contact with the glass or because otherwise actuated), even though the blow-iron itself should during the rolling move bodily in a direction transverse with respect to such axis as in hand marvering. Of course when the blow-iron moves as just mentioned the question whether both the opposed surfaces shall move during the rolling or one of them remain stationary will to some extent be determined by the rate of this movement of the blow-iron if it is rotated during the marvering otherwise than by contact with one of the moving surfaces, its rate of rotation, (if produced otherwise than by a separately actuated marvering surface) the size of the body of glass and the shape to be given it, whether and to what extent slipping between the surface of the glass and either or both the surfaces against which it is rolled is permissible under the conditions of the particular case, etc. For some specific forms of my method, the opposed surfaces employed may be surfaces of revolution, while for other forms one or both of them may be flat or have some other shape.

In the marvering mechanism 9 illustrated in Figs. 1, 3, 20 and 21, the opposed surfaces between which the batch of glass rotates as above set forth are those of a pair of rolls 901 and 902 mounted so that they may revolve about more or less nearly vertical axes 903 and 904. As shown, the right hand roll 901 (Fig. 20) is driven by power from the shaft 250,—preferably at a speed such that most of its surface has a linear velocity somewhere in the neighborhood of that of the surface of the rotating batch of glass on the blow-iron 1 when it swings between the rolls during the rearward movement of the blow-iron as shown in Fig. 11 and moves in the same direction (which is the opposite of that in which the blow-iron swings),—while the left-hand roll 902 is merely mounted so as to revolve freely when the rotating body of glass comes against it, its surface in contact with the glass thus moving in the same direction as that in which the blow-iron swings. The shape of the rolls used at any time will, of course, be such as to give the charge of glass the shape most advantageous for the manufacture of the particular article which is to be made from it: as shown, each of them has a cylindrical surface 905 and a conical surface 906, and the right-hand one 901 (Fig. 20) has a surface 907 perpendicular to the axis of rotation. When they are set as shown, they give the mass of glass the form of a cylinder and a simple cone set base to base; when they are set further apart, the cone portion is truncated. While the blow-iron may if necessary be made to pause in its rearward swing with the batch of glass between the rolls, it will usually be sufficient for it to swing more or less slowly through the rolls without a halt,—which is what happens when the cams 75 and 78 have exactly the forms shown in the drawings.

The surface 907 of the roll 901 just mentioned is, it will be seen, that of a flange at the lower end of said roll which extends beneath the lower edge of the conical lower portion 906 of the roll 902. As will be seen from Fig. 3 (in which the axes 903 and 904 are shown in a vertical position with the rolls 901 and 902 removed in order that parts which would otherwise be hidden by the rolls may appear), the spindle which constitutes the axis 903 carries a feather 908 adapted to engage in an internal groove in the roll 901, this mode of connection allowing both rolls to be removed or replaced with others by merely lifting them off the spindles 903 and 904, or vice versa. Provision is made for varying the distance apart of the spindles to vary the distance between the acting surfaces of the rolls or to accommodate rolls of different sizes by mounting said spindles in relatively adjustable parts 910 and 911. As shown, these parts 910 and 911 have slotted lugs 912 that lie at opposite sides of a lug 913 on a part 914 mounted as hereinafter described and a bolt 915 passes through a hole in the lug 913 and through the slots in the lugs 912, and by tightening the nut on the bolt 915 the parts 910 and 911 can be firmly fixed in the desired relative positions. A double screw member 916 (Fig. 3) mounted at its middle in a lug 917 on the part 914 and secured therein so that it is free to turn but cannot move lengthwise (said screw having a right hand thread at one side of the lug 917 and a left-hand thread at the other and square ends) can be employed to facilitate the adjustment of the parts 910 and 911 and insure that they shall be set at equal distances from the center of the bolt 915 and from the path along which the axis of rotation of the charge of glass swings,—the threaded ends of this member 916 engaging in internally threaded holes in lugs 918 on the parts 910 and 911. The lower portion of the spindle 903 is of somewhat smaller diameter than the portion on which the roll 901 is mounted and is loose on the part 915 so as to revolve freely, and its extreme lower end extends into a hole in the uppermost member of a universal joint 920 and is secured by a pin 921. The shaft 922 to which the lowermost member of the universal joint 920 is secured has its bearing in the hub of a U-shaped bracket 923 of the frame-structure 900 and in connected with a bevelled gear 924 in such a manner that it can slide up and down through said gear but is constrained to turn with it—there being, as shown, a key-way 925 in the shaft in which a feather in the hub of the gear 924 engages. This gear 924 meshes with a gear 926 on a shaft 927 which has its bearing in a hub 928 on the base portion of the structure 900, and the shaft 927 has on its other end a gear 929 which meshes with a gear 930 on the shaft 250. The spindle 904 is in form similar to the spindle 903, but is merely secured in the part 911, as by a set-screw 931.

The part 914 above mentioned is mounted in the forked upper end of a part 932 on a bolt 933 more or less nearly perpendicular to the plane of the paper in Fig. 1, so that no matter how the conditions of operation may vary the axes 903 and 904 can be brought to a position where they will be more or less nearly parallel to the axis of the blow-iron 1 when the charge of glass thereon passes between the rolls and secured in such position by tightening the nut on said bolt so as to clamp the part 914 in the part 932—the universal joint 920 permitting the spindle 903 to occupy any desired angular position with reference to the vertical without interference with the driving thereof. Provision is made for adjusting the rolls up and down by having the corners of one side of the part 932 engage and slide in reentrant grooves 934 in an upright portion 935 of the frame-work 900 (Fig. 21), the key-way and feather connection between the shaft 922 and the gear 924 permitting this quite freely. A bolt 936 passes through a hole in the part 932 and through a vertical slot 937 in the web portion 938 of the upright 935 and enables the part 932 to be clamped at the desired height, the portion of this bolt which lies in the vertical slot 937 having a rectangular cross-section to facilitate the tightening of the nut on the bolt.

In Figs. 22 to 37 inclusive I have shown a form of marvering mechanism in which the opposed surfaces between which the batch of glass on the blow-iron rotates are more or less nearly flat in the direction in which the surface of the glass moves with reference to them. In the mechanism shown, some of the surfaces are faces on a part 1001 which is movable, and others are on a part 1002 which is stationary, and the movement of the part 1001 occurs merely when the glass on the blow-iron 1 is between the parts,—being, indeed, brought about by the blow-iron 1 itself as the charge of glass approaches the parts or comes between them.

As will be seen from Figs. 22, 23, 24, 25, and 26, the movable part 1001 slides on ways on a part 1003 which is curved to a radius corresponding to the effective length of the blow-iron 1 when the glass thereon is in the marverer. This part 1003 has an upstanding flange 1004 at one edge, and the part 1001 has a groove which fits over the flange 1004, and a strip 1005 is detachably secured to the lower outer edge of the part 1001 and extends beneath the lower outer edge of the part 1003 so as to keep the part 1001 from lifting off the flange. As shown in Figs. 22 and 25, the stationary part 1002 is mounted about midlength of the ways on the part 1003, while the movable part 1001 ordinarily occupies the position at the upper left hand end of said ways shown in full lines in Figs. 22 and 25 but moves downward along said ways to the position shown in dotted lines in Fig. 22 while the blow-iron is swinging past the part 1001. The rate of rotation of the blow-iron 1 (which is in the direction indicated by the arrow in Figs. 22 and 25) and the rate at which it swings past the part 1002 will preferably bear such a relation to one another that the batch of glass will roll over the part 1002 without excessive slipping between the surface of said part 1002 and the surface of the glass. Under these conditions, however, the linear velocity of the surfaces of the glass which come in contact with the part 1001 will be greater than the rate of movement of the blow-iron so that to avoid any slipping between such surfaces and those of the part 1001 the rate at which said part 1001 moves downward along the ways as above described during said swinging movement would have to be about twice the rate of swinging of the blow-iron as a whole, and will preferably be at least somewhat quicker than its rate of swinging. Provision may be made for setting the parts 1001 and 1002 at different distances apart to vary the diameter and shape which they give to the batch of glass or to allow parts of different forms or dimensions to be employed. As shown, this adjustment is provided for by having on the lower side of the part 1003 on which the part 1001 slides a projecting portion with transverse edges 1006 adapted to fit and slide between the transverse edges of flanges 1007 at the upper end of the part 1008 on which it is mounted and by having in the upper side of the part 1003 a transverse groove in which a transverse ridge 1009 on a horizontal flange portion 1011 of the stationary part 1002 fits and slides, screws 1012 (Figs. 23 and 24) which pass through slots in said parts 1011 and 1003 serving to clamp and fix these parts on the part 1003 in any desired position with reference to one another and to the path of the blow-iron. Up and down adjustment of the parts 1001 and 1002 is provided for by mounting the part 1008 so as to slide up and down against ways on the portion 1013 of the frame-structure 1000 (Fig. 27), a bolt 1014 which passes through a slot 1015 in said part 1008 serving to clamp said last mentioned part at any desired height.

The movement of the part 1001 on its ways may be produced at the proper time from a constantly rotating shaft 1020 driven through bevel gears 1021 and 1022 from a shaft 250' which corresponds to the shaft 250 but in the marverer shown in Figs. 22 to 38 is supposed to be at the other side of the frame 10 from where it is shown in Fig. 3 and others. As shown, there is a longitudinally extensible member 1023 comprising a hollow part pivoted to the framework of the machine at 1024 and a part pivoted to the part 1001 at 1025 which telescopes and slides in said first-mentioned part. A link 1026 made adjustable in length by being constructed in telescoping sections that can be secured together by a set-screw 1027 connects the member 1023 to a part 1028 mounted on the shaft 1020, and a spring 1029 connected between an arm on the part 1028 and a bracket on the structure 1013 constantly urges the parts 1028, 1023, 1001, etc. to the right (Fig. 26) and makes the full line position at the upper end of the ways (Figs. 22, 23, 24, and 26) the ordinary position of the part 1001 as already mentioned.

As will be seen from Figs. 22, 23, 28, 29, and 30, the part 1028 is practically a member of a clutch mechanism 1030 somewhat similar to the clutches 170 and 220 on the shafts 6 and 12 of the main machine, but differing therefrom in that when it is set it merely causes the part 1028 to swing with the shaft 1020 sufficiently to give the part 1001 its movement above described from the full line position of Figs. 22 and 26 to the dotted line position shown in these figures as above described and presently releases it and allows the spring 1029 to bring it back to the full line position of these figures,—the exact range of movement of the parts 1028 and 1001 being, as shown, regulated by adjustable screw stops 1031 and 1032 in lugs on the part 1028 and by an abutment 1033 on the base 1000 with the opposite sides of which these stops engage. The other important elements of the clutch mechanism 1030 are a driving part 1035 which is free to move lengthwise on the shaft 1020 but is constrained to turn therewith by a key 1036, a part 1037 (Figs. 35 and 36) in which the shaft 1020 can turn freely but which is kept from moving to the right (Figs. 23 and 28) by a collar 1038 secured on the shaft by a set-screw 1039, a spring 1040 which acts between the part 1035 and a portion 1041 of the frame-work 1000 in which the shaft 1020 has a bearing and urges the flat face of the part 1035 against that of a portion 1042 of the part 1028 and so tends to set the clutch, and a part 1043 (see Figs. 28, 30, 31, 32, and 33) which acts between the parts 1035 and 1037 to control the setting and throwing out of the clutch. The part 1043 comprises a hub portion 1044 which fits within the central hole in the portion 1042 of the part 1028 and four approximately radial arms 1045 which lie in more or less nearly radial depressions (Figs. 35 and 36) in the face of the part 1037 next the part 1042 and project a short distance beyond the periphery of the part 1037, and it also has on the side next the part 1035 a projection 1046 with inclined faces which coacts with a similarly shaped but somewhat wider depression 1047 in the adjacent face of the part 1037 just as in the clutch 170 the projection 190 coacts with the inclined faces of the depression 191. Thus when the projection 1046 is at the bottom of the depression 1047 the clutch is set, and when it rides on one of the inclined faces of the depression 1047 the end of the hub 1044 is thrown against the part 1035 and forces its face away from the part 1042 and opens the clutch,—the depressions in the face of the part 1037 being just about wide enough to permit the relative turning of the parts 1043 and 1037 necessary to operate the clutch.

When the parts are at rest (Figs. 26, 29, and 30), one of the arms 1045 is engaged beneath the end of a spring actuated bolt or stop 1048 similar to the bolt 193 of the clutch mechanism 170. When, however, the bolt 1048 is drawn back, the action of the spring 1040 on the inclined faces at 1046 and 1047 will cause a relative turning of the parts 1043 and 1037 sufficient to cause the clutch to set, whereupon the parts 1037, 1043, 1028 etc. will move in the direction indicated by the arrow (Figs. 22 and 30) until the right hand screw stop 1032 comes against the abutment 1033, as already mentioned. At the time that this happens (allowing for such slipping of the clutch 1030 as will ordinarily occur) another arm 1045 will come against the bolt 1048 (which will meanwhile have moved forward again) and the clutch 1030 will be thrown out and allow the spring 1029 to restore the parts 1028 etc. to their initial positions. Thus the part 1035 revolves continuously with the shaft 1020 and parts 1037 and 1043 revolve in quarter turn steps, and the part 1028 swings in the direction of the arrow and back whenever the parts 1037 and 1043 make a quarter turn.

It has already been stated that the movement of the part 1001 is brought about by the blow-iron 1 itself as it brings the batch of glass into the sphere of action of the parts 1001 and 1002. As shown in Figs. 22, 25, 26, 29, 30, and 34, the blow-iron 1 acts directly on an arm 1050 which ordinarily lies diagonally across its path. This arm 1050 is secured by a set-screw 1051 on the upper end of an upright shaft 1052 which at its lower end carries another arm 1053, and a lever 1054 whose lower end carries a pin 1055 which engages in a hole in the arm 1053 has at its upper end a pin 1056 which engages in slots in depending lugs in a part 1057 mounted at the rear end of the bolt 1048, this lever 1054 being fulcrumed at 1058 on the frame-work of the machine. As the blow-iron 1 comes to the marverer on the way from the furnace 4 to the mold 3, it pushes against the arm 1050 and acts through the parts 1052, 1053, 1054, etc. to draw back the bolt 1048 and set the clutch 1030 as above described and then trips past the end of the arm 1050 and allows the spring of the bolt 1048 to restore the parts to their initial positions with the bolt in the path of an arm 1045 of the part 1043 ready to throw out the clutch. As shown, the outer end portion 1059 of the arm 1050 is pivoted at its inner forward corner to the outer forward corner of the main portion 1060 of the arm and a spring 1061 is connected between a pin or stud on a lug on the part 1060 and a pin or stud on the part 1059. This construction causes the arm 1050 to behave as a single member in the actuation of the bolt 1048 when the blow-iron 1 comes to the marverer with a batch of glass and allows the part 1059 to yield and swing to the left to permit the blow-iron to trip past it (Fig. 37) when the latter passes between the parts 1001 and 1002 on its return to the furnace 4 for another batch of glass.

I claim as new and desire to secure by Letters Patent of the United States:

1. A glass-blowing machine comprising a stationary frame, a non-traveling mold mounted thereon, a blow-pipe, means for rotating said blow-pipe about its longitudinal axis and for swinging it from said mold into a glass pot to gather a charge of glass and then back to the said mold, means for marvering said charge during its return to said mold, means for admitting air to said blow-pipe while in operative position with respect to said mold, and means for removing the blown article from the said blow-pipe during its movement toward said glass pot, the aforesaid means comprising means for causing the aforestated operations to be automatic and to follow a predetermined sequence, and a single means for supporting said blow-pipe during all of said operations.

2. A glass-blowing machine comprising a stationary frame, a non-traveling mold mounted thereon, a blow-pipe, means for rotating said blow-pipe about its longitudinal axis, means for swinging said blow-pipe from said mold to a glass pot to gather a charge of glass and then back to said mold, means for marvering said charge during its movement toward said mold, means for admitting air to said blow-pipe, means for removing the blown article from said blow-pipe during its movement toward said glass pot and means for removing the surplus glass from said blow-pipe, the aforesaid means comprising means for causing all of the aforestated operations to be automatic and to follow a predetermined sequence, and a single means for supporting said blow-pipe during all of said operations.

3. A glass-blowing machine comprising a stationary frame, a non-traveling mold mounted thereon, a blow-pipe, means for rotating said blow-pipe about its longitudinal axis and for swinging it from said mold into a glass pot to gather a charge of glass and then back to the said mold, means for marvering said charge during its return to said mold, means for admitting air to said blow-pipe while in operative position with respect to said mold and means for removing the blown article from the said blow-pipe during its movement toward said glass pot, the aforesaid means comprising means for causing the aforestated operations to be automatic and to follow a predetermined sequence, and a single means for supporting said blow-pipe and maintaining it in substantially the same vertical plane during all of said operations.

4. A glass-blowing machine comprising a frame adapted to be placed adjacent a glass pot, means mounted on said frame for supporting a blow-pipe, a marvering apparatus and a non-traveling mold disposed on one side of said frame and means for swinging said blow-pipe from said mold to the glass pot to gather a charge of glass and back through said marvering apparatus and into operative position with respect to said mold.

5. A glass-blowing machine comprising a frame adapted to be placed adjacent a glass pot, means mounted on said frame for supporting a blow-pipe, a marvering apparatus and a non-traveling mold disposed on one side of said frame and means for swinging said blow-pipe from said mold to the glass pot to gather a charge of glass and back through said marvering apparatus and into operative position with respect to said mold, the aforesaid means comprising means for causing all of the aforestated means to operate automatically, and means for causing said operations to follow a predetermined sequence.

6. A glass-blowing machine comprising a frame adapted to be placed adjacent a glass pot, means mounted on said frame for supporting a blow-pipe, a marvering apparatus and a mold disposed on one side of said frame and means for swinging said blow-pipe from said mold to the glass pot to gather a charge of glass and back through said marvering apparatus and into operative position with respect to said mold, the said blow-pipe remaining in substantially the same vertical plane during all of the said operations.

7. The combination with a blow-pipe and a carrying mechanism therefor of a marvering device comprising juxtaposed parts between which the charge of glass on said blow pipe passes, one of said parts being mounted so as to allow it to move parallel to the direction of movement of the charge of glass.

8. The combination with a blow-pipe and a carrying mechanism therefor of a device for marvering a charge of glass on said blow pipe comprising juxtaposed, substantially parallel parts between which the charge of glass passes, one of said parts being mounted so as to allow it to be moved by the charge of glass in a direction substantially parallel with that of the movement of said charge of glass.

9. The combination with a blow pipe and a carrying mechanism therefor of a marvering device comprising a pair of juxtaposed members forming therebetween an aperture of predetermined shape, at least one of said parts being loosely mounted and adapted to be driven by the charge of glass on said blow pipe during its passage through the said aperture and to roll the said charge of glass into a shape similar to that of the said aperture.

10. A glass blowing machine comprising a stationary frame adapted to be placed adjacent a glass pot, a mold mounted thereon, a column pivotally mounted on said frame, a blow-pipe carried by said column, means for tilting said column downwardly toward said glass pot, means for tilting said blow-pipe independently of said column to enter said glass pot, and means for thereafter raising said column and causing said blow-pipe to swing into operative relation with said mold.

11. A glass blowing machine comprising a stationary frame adapted to be placed adjacent a glass pot, a mold mounted thereon, a hollow column pivotally mounted on said frame and constituting an air reservoir, means for tilting said column downwardly toward said glass pot, means for tilting said blow-pipe independently of said column to enter said glass pot, means for thereafter raising said column and causing said blow-pipe to swing into operative relation with said mold, and means for effecting communication between said column and said blow-pipe at predetermined intervals.

12. A glass blowing machine comprising a stationary frame adapted to be placed adjacent a glass pot, a mold movably mounted thereon, a column pivotally mounted on said frame, a blow-pipe carried by said column, means for tilting said column downwardly toward said glass pot, means for tilting said blow-pipe independently of said column to enter said glass pot, means for thereafter raising said column and causing said blow-pipe to swing into operative relation with said mold, a liquid receptacle and means for causing said mold to enter said receptacle at predetermined intervals.

13. A glass blowing machine comprising a frame adapted to be placed adjacent a glass pot, means mounted on said frame for supporting a blow-pipe, a marvering apparatus, means for swinging said blow-pipe from a mold to said glass pot to gather a charge of glass then through said marvering apparatus to preliminarily shape the same and then into operative relation with said mold, the said blow-pipe remaining in substantially the same vertical plane during all of the said operations.

14. A glass blowing machine comprising a stationary frame, a blow-pipe supported on said frame, a marvering apparatus, a cracking-off apparatus, a blow-pipe cleaning apparatus, all said apparatus being arranged in line, and means whereby said blow-pipe may be swung through said marvering apparatus to said mold and back through said cracking-off apparatus and said blow-pipe cleaning apparatus in succession.

15. A glass blowing machine comprising a mold, a blow-pipe supported on said frame, means for causing said blow-pipe to be continuously rotated, a marvering apparatus comprising a pair of juxtaposed members forming therebetween an aperture of predetermined shape and having one of said members loosely mounted, means whereby said blow-pipe may be swung with its end in said aperture so that a charge of glass carried by said end will cause the rotation of said loosely mounted member.

16. In a machine for the manfacture of blown glass articles, the combination with a mold, and a cleaner, of a movable blow-pipe supporting arm mounted on a horizontal shaft for pivotal movement, a blow-pipe carrier in the arm, and means for oscillating the supporting arm to effect a gather upon the blow-pipe and to subsequently present the blow-pipe to the mold and cleaner.

17. In a glass blowing machine, the combination of blowing and molding mechanisms, and a stationary cleaner, of a blow-pipe and a supporting arm therefor, means for translating the blow-pipe and its supporting arm to the blowing and molding mechanisms, and means for arresting the translatory movement of the blow-pipe and its supporting arm when in operative relation with the cleaner.

18. In a glass working machine, the combination of a supporting arm mounted on a horizontal pivot for translatory movement through a vertical plane, a gathering device carried thereby, mechanisms including a marverer, a mold, and a cleaner mounted in said plane, and means for positioning the supporting arm and the glass gathering device carried thereby into cooperative relation with the said mechanisms.

19. In a glass working machine, the combination with a supporting arm mounted on a horizontal pivot for movement through a vertical plane, a gathering device carried thereby, a marverer, a mold, a cleaner, a motor, and means actuated thereby for effecting a translatory movement of the supporting arm and the gathering device carried thereby to position the said gathering device into operative relation with the marverer, mold, and cleaner, and means for actuating the marverer, mold and cleaner.

20. In a glass working machine, the combination of a supporting frame mounted on a horizontal pivot for translatory movement from one position to another position in the same vertical plane, a gathering device carried by the said support, a marverer, a mold, and a cleaner, means for moving the blow-pipe into cooperative relation with the marverer, mold and cleaner, and means for admitting air into the gathering device.

21. In a glass working machine, the combination of a supporting arm, a gathering device carried thereby and movable thereon, a glass pot, a mold, and a cleaner, means for moving the supporting arm, means for arresting its movement when in proximity to the glass pot, means for projecting the gathering device into and out of the glass pot, and means for subsequently positioning the gathering device into cooperative relation with the mold and cleaner.

22. In a glass working machine, the combination of a supporting arm mounted on a horizontal pivot for translatory movement through a vertical plane, a glass working spindle carried thereby, a marverer, a mold and an air mechanism, means for positioning the supporting arm and the glass working spindle carried thereby into cooperative relation with the marverer and mold, and means for actuating the air mechanism.

23. In a glass working machine, the combination of a supporting arm mounted on a horizontal pivot for translatory movement through a vertical plane, a glass working spindle carried thereby, a mold, a source of air supply, a motor, and means driven thereby in a predetermined order and time for positioning the glass working spindle in operative position in respect to the mold, means for closing the mold, and means for admitting air to the glass-working spindle.

24. The combination with a mold, of a glass working spindle adapted to carry a body of plastic glass, a support for the spindle, means for swinging the spindle with the glass thereon in a vertical plane about its horizontal axis, and for arresting the spindle in vertical position with its longitudinal axis in alignment with the mold and with the glass thereon adjacent to the mold, and means for projecting the spindle upon its longitudinal axis when in such vertical position.

25. In a glass-blowing machine, the combination of a spindle adapted to carry a mass of glass, a support for the spindle, a mold and means for moving the spindle on its longitudinal axis and abruptly arresting said motion when the said spindle is in axial alinement with the closed position of the said mold to cause an elongation of the glass.

26. In a glass-forming apparatus, the combination with a spindle adapted to carry a mass of glass, and means for introducing air into the same, of mechanism for imparting a movement to the spindle in the direction of its length when the spindle with its glass carrying end downward assumes a vertical position.

27. In a glass-forming apparatus, the combination with a device adapted to hold a mass of glass, of mechanism for imparting movement to the holding device on its longitudinal axis and for arresting said movement to effect an elongation of the gather.

28. In a glass forming apparatus the combination with a spindle adapted to support a gather of the unenclosed glass from the upper end of the latter, mechanism for imparting movement to the spindle in the direction of its length and for arresting such motion, whereby the gather is elongated, and means for introducing air through the spindle into the elongated gather.

29. In a glass-working apparatus, the combination with a moving support, a glass carrying device adapted to support a mass of glass and adapted to be held in substantially vertical position with the blank downward, and mechanism whereby a longitudinal movement is imparted to the carrying device while in the aforesaid position and whereby such movement is arrested to elongate the blank.

30. In a glass working apparatus the combination with a movable support, a spindle mounted thereon and adapted to support in a substantially vertical position a gather of unenclosed glass from the upper end of the latter, a cam and connecting mechanism between the cam and spindle, whereby a longitudinal motion is imparted to the spindle and gather thereon while in the substantially vertical position and whereby such motion is arrested to elongate the gather, and means for introducing air through the spindle into the gather of glass contained thereon.

31. In a glass-working machine, the combination of a device adapted to carry a mass of glass, a movable support therefor, a glass pot, and a mold, means for moving the support and device carried thereby to effect a gather of glass from the glass pot, means for subsequently moving the support and gathering device to vertically position the gathering device, means for moving the gathering device on its longitudinal axis, and means for closing the mold about the glass carried by the gathering device after the elongation thereof.

32. The combination with a glass-working spindle, of means for automatically rotating said spindle about its longitudinal axis, of means for automatically moving said spindle upon a different axis, and means for automatically moving said spindle on its longitudinal axis and abruptly arresting such movement with the gather on the lower end thereof.

In witness whereof I have hereunto set my hand this 22nd day of January, 1913.

NOBLE W. HARTMAN.

Witnesses:
FREDERICK E. LEONARD,
RICHARD J. TIGHE.